US012624775B2

(12) United States Patent
Takahashi et al.

(10) Patent No.: US 12,624,775 B2
(45) Date of Patent: May 12, 2026

(54) TUBE

(71) Applicant: MAX CO., LTD., Tokyo (JP)

(72) Inventors: Hiroaki Takahashi, Tokyo (JP); Akihiro Kogure, Tokyo (JP)

(73) Assignee: Max Co., Ltd., Tokyo (JP)

( * ) Notice: Subject to any disclaimer, the term of this patent is extended or adjusted under 35 U.S.C. 154(b) by 349 days.

(21) Appl. No.: 18/071,204

(22) Filed: Nov. 29, 2022

(65) Prior Publication Data

US 2023/0167924 A1 Jun. 1, 2023

(30) Foreign Application Priority Data

Nov. 30, 2021 (JP) ................................ 2021-194845

(51) Int. Cl.
*F16L 11/12* (2006.01)
*F16L 11/06* (2006.01)

(52) U.S. Cl.
CPC ............. *F16L 11/121* (2013.01); *F16L 11/06* (2013.01)

(58) Field of Classification Search
CPC .......... H01B 7/36; H01B 7/365; H01B 7/368; G09F 3/06; G09F 3/205; G09F 3/0295; F16L 11/12; F16L 11/121; F16L 7/00; H02G 3/0487
USPC .......................................................... 138/119
See application file for complete search history.

(56) References Cited

U.S. PATENT DOCUMENTS 3,534,777 A * 10/1970 Loof ..................... G09F 3/0295 138/104
3,648,895 A * 3/1972 Strazdins .............. B65D 35/04 138/119
4,378,648 A 4/1983 Loof et al.
5,027,538 A 7/1991 Wilmes et al.
5,141,360 A * 8/1992 Zeman .................. A01G 25/02 405/36
2004/0098890 A1 5/2004 Mellgren

FOREIGN PATENT DOCUMENTS

CN 1298469 A * 6/2001 ........... E21B 43/103
CN 206685185 U 11/2017
DE 102013007037 A1 10/2014
EP 0 568 510 A1 11/1993

(Continued)

OTHER PUBLICATIONS

Extended European Search Report for EP Application No. 22209855.0 mailed Jul. 14, 2023. (13 pp.).

*Primary Examiner* — Kenneth Rinehart
*Assistant Examiner* — Haotian Lu
(74) *Attorney, Agent, or Firm* — Banner & Witcoff, Ltd.

(57) ABSTRACT

A long tube formed of an elastic material includes: an upper portion including a printable upper surface; a lower portion facing the upper portion; a first side wall connecting the upper portion and the lower portion; a second side wall connecting the upper portion and the lower portion and facing the first side wall; a first upper joint portion located at a connection portion between the upper portion and the first side wall and configured to bend the first side wall with respect to the upper portion; a first lower joint portion located at a connection portion between the lower portion and the first side wall and configured to bend the first side wall with respect to the lower portion; and a first side wall joint portion configured to bend the first side wall.

5 Claims, 8 Drawing Sheets

(56) References Cited

FOREIGN PATENT DOCUMENTS

| | | | | | |
|---|---|---|---|---|---|
| EP | 3965092 | A1 * | 3/2022 | ............. | G09F 3/205 |
| FR | 2667427 | A1 * | 4/1992 | ............. | G09F 3/205 |
| JP | S61-107111 | A | 5/1986 | | |
| JP | S61-107111 | U | 7/1986 | | |
| JP | H07-070261 | B2 | 7/1995 | | |
| JP | 2004-506295 | A | 2/2004 | | |
| JP | 2019-067487 | A | 4/2019 | | |
| WO | WO-8705740 | A1 * | 9/1987 | ............... | G09F 3/06 |
| WO | 93-004489 | A1 | 3/1993 | | |
| WO | WO-2008125338 | A1 * | 10/2008 | ............. | G09F 3/205 |

* cited by examiner

TUBE

CROSS-REFERENCE TO RELATED APPLICATIONS

This application is based on and claims priority under 35 USC 119 from Japanese Patent Application No. 2021-194845 filed on Nov. 30, 2021, the contents of which are incorporated herein by reference.

TECHNICAL FIELD

The present disclosure relates to a tube.

BACKGROUND

A sleeve (an example of a "tube"; hereinafter, the "sleeve" may be referred to as a "tube") for distinguishing a linear body (hereinafter, cables or other objects that are elongated are referred to as "linear bodies") such as a cable or an electric wire from other linear bodies is known. By printing identification information such as a character, a symbol, or a figure on a surface of the tube and inserting the linear body through the tube, the linear body can be distinguished from the other linear bodies.

International Publication No. WO87/05740 (hereinafter, referred to as PTL 1) describes a tube including an upper portion and a lower portion and provided with a surface having a wave shape in a cross section below a printed surface.

However, the inventors of the present application have noticed that the tube described in PTL 1 is not a tube that is originally required to be crushed in a direction in which the upper portion approaches the lower portion for printing, and even if the tube is crushed, a position of the upper portion cannot be uniquely determined with respect to a position of the lower portion. The tube described in PTL 1 has a uniform thickness and the wave shape in the cross section, and when the tube is crushed in the direction in which the upper portion approaches the lower portion, the position of the upper portion cannot uniquely determined with respect to the position of the lower portion.

Further, such a problem may be caused by unevenness of winding when a long tube is wound around a drum or the like, dimensional variation during molding of the long tube, temperature unevenness during cooling after the molding, or the like. When the upper portion of the tube is crushed in the direction approaching the lower portion and printed, if the position of the upper portion cannot uniquely determined with respect to the position of the lower portion, a printing position is shifted or a character is blurred, so that the printing cannot be performed well. For example, when a tube of another production lot is used, the printing position may be shifted, or when wound positions are different in the same drum, the printing position may be shifted.

Therefore, an object of the present disclosure is to provide a long tube in which a position of an upper portion when the long tube is crushed is uniquely determined with respect to a position of a lower portion (a shift to left and right is small).

SUMMARY

The present application discloses, for example, a closed type long tube formed of an elastic material.

The tube includes: an upper portion including a printable upper surface; a lower portion facing the upper portion; a first side wall connecting the upper portion and the lower portion; a second side wall connecting the upper portion and the lower portion and facing the first side wall; a first upper joint portion located at a connection portion between the upper portion and the first side wall and configured to bend the first side wall with respect to the upper portion; a first lower joint portion located at a connection portion between the lower portion and the first side wall and configured to bend the first side wall with respect to the lower portion; and a first side wall joint portion configured to bend the first side wall.

The tube may be configured such that the first upper joint portion bends the first side wall inward with respect to the upper portion, the first lower joint portion bends the first side wall inward with respect to the lower portion, and the first side wall joint portion is located inside the first upper joint portion and the first lower joint portion, and bends the first side wall inward.

Here, the term "inward" refers to a direction toward an inside of a region surrounded by an inner wall surface of the tube, "inward with respect to the first side wall" includes a direction approaching the second side wall, and "inward with respect to the second side wall" includes a direction approaching the first side wall.

In the tube, the first upper joint portion may be formed to be thinner than a thickness of the upper portion, the first lower joint portion may be formed to be thinner than a thickness of the lower portion, and the first side wall joint portion may be formed to be thinner than a thickness of the first side wall.

The tube may include a second upper joint portion located at a connection portion between the upper portion and the second side wall and configured to bend the second side wall inward with respect to the upper portion.

The tube may include a second lower joint portion located at a connection portion between the lower portion and the second side wall and configured to bend the second side wall inward with respect to the lower portion.

The tube may include a second side wall joint portion located inside the second upper joint portion and the second lower joint portion and configured to bend the second side wall inward.

Here, the upper portion may be contactable with a first side wall upper portion and a second side wall upper portion, and the lower portion may be contactable with a first side wall lower portion and a second side wall lower portion.

In the tube, the first side wall may include a first side wall upper portion located between the first upper joint portion and the first side wall joint portion, and a first side wall lower portion located between the first lower joint portion and the first side wall joint portion, the second side wall may include a second side wall upper portion located between the second upper joint portion and the second side wall joint portion, and a second side wall lower portion located between the second lower joint portion and the second side wall joint portion, and in a cross-sectional view, portions including the first side wall upper portion, the first upper joint portion, the upper portion, the second upper joint portion, and the second side wall upper portion may be configured to be vertically symmetrical to portions including the first side wall lower portion, the first lower joint portion, the lower portion, the second lower joint portion, and the second side wall lower portion, respectively.

In the tube, the first side wall may include a first side wall upper portion located between the first upper joint portion and the first side wall joint portion, and a first side wall lower portion provided between the first lower joint portion and the first side wall joint portion, the second side wall may include a second side wall upper portion located between the second upper joint portion and the second side wall joint portion, and a second side wall lower portion located between the second lower joint portion and the second side wall joint portion, and in a cross-sectional view, a value obtained by subtracting, from a distance between the first upper joint portion and the second upper joint portion, a sum of a distance between the first side wall joint portion and the first upper joint portion and a distance between the second side wall joint portion and the second upper joint portion may be the same as a value obtained by subtracting, from a distance between the first lower joint portion and the second lower joint portion, a sum of a distance between the first side wall joint portion and the first lower joint portion and a distance between the second side wall joint portion and the second lower joint portion.

The upper portion may have a thickness equal to or greater than thicknesses of the first side wall and the second side wall in a cross-sectional view of the tube.

The upper surface may include a flat surface, and the lower portion may include a lower surface including a flat surface parallel to the flat surface.

In the cross-sectional view of the tube, a distance between the first upper joint portion and the second upper joint portion may be equal to a distance between the first lower joint portion and the second lower joint portion, a distance between the first side wall joint portion and the first upper joint portion, a distance between the second side wall joint portion and the second upper joint portion, a distance between the first side wall joint portion and the first lower joint portion, a distance between the second side wall joint portion and the second lower joint portion may be the same, and the distance between the first side wall joint portion and the first upper joint portion may be 50% or less of the distance between the first upper joint portion and the second upper joint portion.

The present application discloses different tubes. This tube is, for example, a closed type long tube formed of an elastic material. Further, the tube includes: an upper portion including a printable upper surface; a lower portion; a first upper connection portion connected to the upper portion; a first lower connection portion connected to the lower portion; a first side wall connected to the upper portion via the first upper connection portion, connected to the lower portion via the first lower connection portion, and including a first side wall joint portion that is bent at a first predetermined position between the upper portion and the lower portion when the upper portion and the lower portion approach each other; a second upper connection portion connected to the upper portion; a second lower connection portion connected to the lower portion; and a second side wall connected to the upper portion via the second upper connection portion, connected to the lower portion via the second lower connection portion, and including a second side wall joint portion that is displaced in a direction away from the first side wall and bent at a second predetermined position between the upper portion and the lower portion when the upper portion and the lower portion approach each other.

The tube may further include: a contact piece protruding from an inner wall surface of the tube and configured to be elastically deformed to come into contact with a linear body when the linear body is inserted through a region surrounded by the inner wall surface.

The present application discloses a different long tube. The tube includes: an upper portion including a printable upper surface; a lower portion including a lower surface facing in a direction opposite to the upper surface; a first side wall connecting the upper portion and the lower portion and including a first joint portion that is deformed at a first predetermined position between the upper portion and the lower portion when the upper portion and the lower portion approach each other; and a second side wall connecting the upper portion and the lower portion and including a second joint portion that is deformed at a second predetermined position between the upper portion and the lower portion when the upper portion and the lower portion approach each other.

In the tube, the first side wall may include: a first side wall upper portion provided between the first joint portion and the upper portion and having a thickness larger than a first thickness in a cross section; a first side wall lower portion provided between the first joint portion and the lower portion and having a thickness larger than the first thickness in the cross section; and the first joint portion provided between the first side wall upper portion and the first side wall lower portion and having a thickness of the first thickness in the cross section, and the second side wall may include: a second side wall upper portion provided between the second joint portion and the upper portion and having a thickness larger than the first thickness in the cross section; a second side wall lower portion provided between the second joint portion and the lower portion and having a thickness larger than the first thickness in the cross section; and the second joint portion provided between the second side wall upper portion and the second side wall lower portion and having a thickness of the first thickness in the cross section.

In the tube according to any one of the above aspects, the first side wall may include: a first side wall upper portion provided between the first joint portion and the upper portion and extending in a direction from a first upper connection portion to the lower portion and the second side wall in a cross section; a first side wall lower portion provided between the first joint portion and the lower portion and extending in a direction from a first lower connection portion to the upper portion and the second side wall in the cross section; and the first joint portion provided between the first side wall upper portion and the first side wall lower portion, having a curvature radius equal to or greater than a first curvature radius along an inner wall surface, and having a curvature radius less than the first curvature radius along an outer wall surface in the cross section, and the second side wall may include: a second side wall upper portion provided between the second joint portion and the upper portion and extending in a direction from a second upper connection portion to the lower portion and the first side wall in a cross section; a second side wall lower portion provided between the second joint portion and the lower portion and extending in a direction from a second lower connection portion to the upper portion and the first side wall in the cross section; and the second joint portion provided between the second side wall upper portion and the second side wall lower portion, having a curvature radius equal to or greater the first curvature radius along an inner wall surface, and having a curvature radius less than the first curvature radius along an outer wall surface in the cross section.

Alternatively, the first side wall may include: a first side wall upper portion provided between the first joint portion and the upper portion and extending in a direction from a first upper connection portion to the lower portion in a cross section; a first side wall lower portion provided between the first joint portion and the lower portion and extending in a direction from a first lower connection portion to the upper portion in the cross section; and the first joint portion provided between the first side wall upper portion and the first side wall lower portion, having a curvature radius equal to or greater than a first curvature radius along an outer wall surface, and having a curvature radius less than the first curvature radius along an inner wall surface in the cross section, and the second side wall may include: a second side wall upper portion provided between the second joint portion and the upper portion and extending in a direction from a second upper connection portion to the lower portion in the cross section; a second side wall lower portion provided between the second joint portion and the lower portion and extending in a direction from a second lower connection portion to the upper portion in the cross section; and the second joint portion provided between the second side wall upper portion and the second side wall lower portion, having a curvature radius equal to or greater the first curvature radius along an outer wall surface, and having a curvature radius less than the first curvature radius along an inner wall surface in the cross section.

In the tube according to any one of the above aspects, the first side wall may include: a first side wall upper portion formed of an elastic material having an elastic modulus equal to or greater than a first elastic modulus and provided between the first joint portion and the upper portion; a first side wall lower portion formed of an elastic material having an elastic modulus equal to or greater than the first elastic modulus and provided between the first joint portion and the lower portion; and the first joint portion formed of an elastic material having an elastic modulus less than the first elastic modulus and provided between the first side wall upper portion and the first side wall lower portion, and the second side wall may include: a second side wall upper portion formed of an elastic material having an elastic modulus equal to or greater than the first elastic modulus and provided between the second joint portion and the upper portion; a second side wall lower portion formed of an elastic material having an elastic modulus equal to or greater than the first elastic modulus and provided between the second joint portion and the lower portion; and the second joint portion formed of an elastic material having an elastic modulus less than the first elastic modulus and provided between the second side wall upper portion and the second side wall lower portion.

In the tube according to any one of the above aspects, in a case where the first joint portion is provided on a second side wall side with respect to a straight line connecting the first upper connection portion and the first lower connection portion and the second joint portion is provided on a first side wall side with respect to a straight line connecting the second upper connection portion and the second lower connection portion, a value obtained by subtracting, from a distance between the first upper connection portion and the second upper connection portion, a sum of a distance between the first joint portion and the first upper connection portion and a distance between the second joint portion and the second upper connection portion may be the same as a value obtained by subtracting, from a distance between the first lower connection portion and the second lower connection portion, a sum of a distance between the first joint portion and the first lower connection portion and a distance between the second joint portion and the second lower connection portion in a cross section.

In the tube according to any one of the above aspects, in a case where the first joint portion is provided farther from the second side wall than the first upper connection portion and the first lower connection portion, and the second joint portion is provided farther from the first side wall than the second upper connection portion and the second lower connection portion, a sum of a distance between the first upper connection portion and the second upper connection portion, a distance between the first joint portion and the first upper connection portion, and a distance between the second joint portion and the second upper connection portion may be equal to a sum of a distance between the first lower connection portion and the second lower connection portion, a distance between the first joint portion and the first lower connection portion, and a distance between the second joint portion and the second lower connection portion in a cross section.

A long tube of a type that bends inward among the long tubes according to any one of the above aspects may be configured such that the first side wall includes: a first upper connection portion connected to the upper portion; a first lower connection portion connected to the lower portion; the first joint portion; a first side wall upper portion provided between the first upper connection portion and the first joint portion; and a first side wall lower portion provided between the first lower connection portion and the first joint portion, the second side wall includes: a second upper connection portion connected to the upper portion; a second lower connection portion connected to the lower portion; the second joint portion; a second side wall upper portion provided between the second upper connection portion and the second joint portion; and a second side wall lower portion provided between the second lower connection portion and the second joint portion, and in the cross section, when a virtual tangent line that is in contact with the lower surface at least two points, that is, a first point on the lower surface on a first side wall side and a second point on the lower surface on a second side wall side is defined as an axis, a position of the first lower connection portion closest to the second point in an axial direction is located between the first point and the second point in the direction, and a position of the first lower connection portion closest to the second point in the axial direction is located between the first point and the second point in the axial direction, and an inner wall of the second lower connection portion that is farthest from the second point in the axial direction is located between the first point and the second point in the axial direction.

In the tube according to any one of the above aspects, the first side wall may include: a first side wall upper portion provided between the first joint portion and the first upper connection portion and having a thickness equal to or greater than a first thickness in a cross section; a first side wall lower portion provided between the first joint portion and the first lower connection portion and having a thickness equal to or greater than the first thickness in the cross section; the first joint portion provided between the first side wall upper portion and the first side wall lower portion and having a thickness less than the first thickness in the cross section; a third joint portion provided between the first side wall upper portion and the first side wall lower portion and having a thickness less than the first thickness in the cross section; and a first side wall middle portion provided between the first joint portion and the third joint portion and having a thickness equal to or greater than the first thickness in the cross section, and the second side wall may include: a second side wall upper portion provided between the second joint portion and the second upper connection portion and having a thickness equal to or greater than the first thickness in the cross section; a second side wall lower portion provided between the second joint portion and the second lower connection portion and having a thickness equal to or greater than the first thickness in the cross section; the second joint portion provided between the second side wall upper portion and the second side wall lower portion and having a thickness less than the first thickness in the cross section; a fourth joint portion provided between the second side wall upper portion and the second side wall lower portion and having a thickness less than the first thickness in the cross section; and a second side wall middle portion provided between the second joint portion and the fourth joint portion and having a thickness equal to or greater than the first thickness in the cross section.

In the tube, the first side wall and the second side wall may have a thickness less than half a thickness of the upper portion.

In the tube, the first side wall and the second side wall may have a thickness less than half a thickness of the lower portion.

The present application further discloses a closed type long tube formed of an elastic material. The tube includes: an upper portion including a printable upper surface; a lower portion; a first upper joint portion connected to the upper portion and deformed when the upper portion and the lower portion approach each other; a first lower joint portion connected to the lower portion and deformed when the upper portion and the lower portion approach each other; a first side wall connected to the upper portion via the first upper connection portion, connected to the lower portion via the first lower connection portion, and including a first joint portion that is bent at a first predetermined position between the upper portion and the lower portion when the upper portion and the lower portion approach each other; a second upper joint portion connected to the upper portion and deformed when the upper portion and the lower portion approach each other; a second lower joint portion connected to the lower portion and deformed when the upper portion and the lower portion approach each other; and a second side wall connected to the upper portion via the second upper connection portion, connected to the lower portion via the second lower connection portion, and including a second joint portion that is displaced in a direction approaching the first side wall and bent at a second predetermined position between the upper portion and the lower portion when the upper portion and the lower portion approach each other, the upper portion has a thickness equal to or greater than a thickness of the first side wall and the second side wall in a vertical direction in a cross section, an upper surface of the upper portion is flat in the cross section in a first state in which an external force does not act on the tube, and the upper surface of the upper portion is flat in the cross section in a second state in which the upper portion and the lower portion approach each other due to the downward external force acting on the upper surface of the tube.

The tube may be configured such that in the second state, the first side wall and the second side wall are bent to come into contact with the upper portion and the lower portion, respectively.

The lower portion may have a thickness equal to or greater than the thickness of the first side wall and the second side wall in the vertical direction in the cross section.

A lower surface of the lower portion may be parallel to the upper surface in the cross section.

In the tube in the first state, the upper surface may include a flat surface, and a distance between the upper surface and the lower surface in the cross section may be 80% or more of a width of the upper surface in the cross section.

In a third state in which a linear body is inserted into a tube formed by separating the long tube, the upper surface may include a flat surface, and a distance between the upper surface and the lower surface in the cross section may be larger than the distance between the upper surface and the lower surface in the cross section in the second state.

Here, the "closed type" tube refers to a tube whose inner wall surface is a closed line when the tube is cut along a cross section perpendicular to an extending direction. The long tube is preferably used for distinguishing the linear body from other linear bodies by printing the long tube in a state in which the long tube is crushed by a pressing member such as a thermal head, then cutting a printed portion, and inserting the linear body such as a cable through a region surrounded by an inner wall surface of the cut tube.

The "joint portion" refers to a portion serving as a starting point of deformation since the joint portion is more easily deformed by an external force than a peripheral portion. The "joint portion" may be achieved by, for example, setting a moment of inertia of area smaller than that of a peripheral portion. The "joint portion" may be achieved, for example, by setting a thickness (wall thickness) of a predetermined portion in a cross section smaller than that of a peripheral portion, by providing a notch (edge) in the predetermined portion, by providing a groove or a hole in the predetermined portion, by providing a portion deformed with a curvature smaller than that of the peripheral portion, or by providing a portion made of a material having an elastic modulus smaller than that of the peripheral portion.

The "thickness" or the "wall thickness" is determined based on a length of a line segment extending from an inner wall surface to an outer wall surface in a main portion in a cross section perpendicular to the extending direction of the tube.

"Bend" refers to folding, and "curve" refers to bending in a bow shape. The "bend" includes a case of bending with a relatively small curvature radius compared to the "curve" and a case of bending with a discontinuous curvature. For example, as a result of bending a side wall at a joint portion, when two adjacent portions sandwiching the joint portion are bent so as to come into contact with each other, it can be said that the joint portion of the side wall is bent. In other words, "bend" means bending at an acute angle.

Further, the term "same" includes not only a case where two values are designed to be completely the same, but also a case where a relationship of $(X-Y)/X \leq 20\%$ is satisfied since a difference between the large value X and the small value Y is small even when the two values have a magnitude relationship. For example, in a case of $X=10$ and $Y=9$, since $(10-9)/10=10\% \leq 20\%$, X and Y are "the same".

DESCRIPTION OF EMBODIMENTS

Hereinafter, embodiments of the present disclosure will be described with reference to the drawings. The following embodiments are examples for explaining the present disclosure, and are not intended to limit the present disclosure only to the embodiments.

First Embodiment

A long tube 10 (FIG. 1A) according to the present embodiment is cut to a desired length after a character, a figure, a color, a symbol, or the like (hereinafter, referred to as "characters or the like") is printed on an upper surface 10US by a printing device (not shown). By inserting a cable such as an optical fiber cable, an electric wire, or another elongated linear body into such a tube (hereinafter, a part of a cut long tube may be referred to as a "long tube" or simply a "tube" without distinction) and causing the cable, the electric wire, or the other elongated linear body to pass therethrough, it is possible to distinguish the cable, the electric wire, or the other elongated linear body from other linear bodies.

The printing device (not shown) includes, for example, a cassette holder for mounting the long tube 10 wound around a drum or the like, a ribbon holder for mounting an ink ribbon cassette, a platen roller for conveying the long tube 10 mounted on the cassette holder, a thermal head for printing the characters or the like on the upper surface 10US of the long tube 10 by pressing the long tube 10 conveyed by the platen roller over an ink ribbon of the ink ribbon cassette, and a half-cut mechanism for cutting the printed long tube 10. Since the thermal head moves in a direction approaching the platen roller, the ink ribbon and the long tube 10 are sandwiched by the thermal head and the platen roller, and an ink of the ink ribbon is transferred to the upper surface 10US of the long tube 10 by heat of the thermal head, it is possible to print characters or the like on the upper surface of the long tube. At this time, the long tube formed in a cylindrical shape is crushed by the thermal head. The long tube temporarily crushed in a printing state is restored to a cylindrical shape by elasticity. Thereafter, the long tube 10 is half-cut by the half-cut mechanism and is discharged to an outside as the tube 10.

Such a long tube 10 is of a closed type in which an inner wall surface forms a closed line when cut along a cross section perpendicular to an extending direction of the long tube 10 as shown in FIGS. 1A to 1D. Therefore, a linear body is not detached from the tube 10 after the linear body is inserted into and passes through a region surrounded by the inner wall surface of the tube 10. Such a long tube 10 is made of an elastic material. Therefore, the long tube 10 can be restored after being crushed by the thermal head, and the linear body can be inserted into (inserted through) the region surrounded by the inner wall surface. Such a long tube 10 is manufactured by, for example, extruding a resin material having elasticity.

Figure 1A:
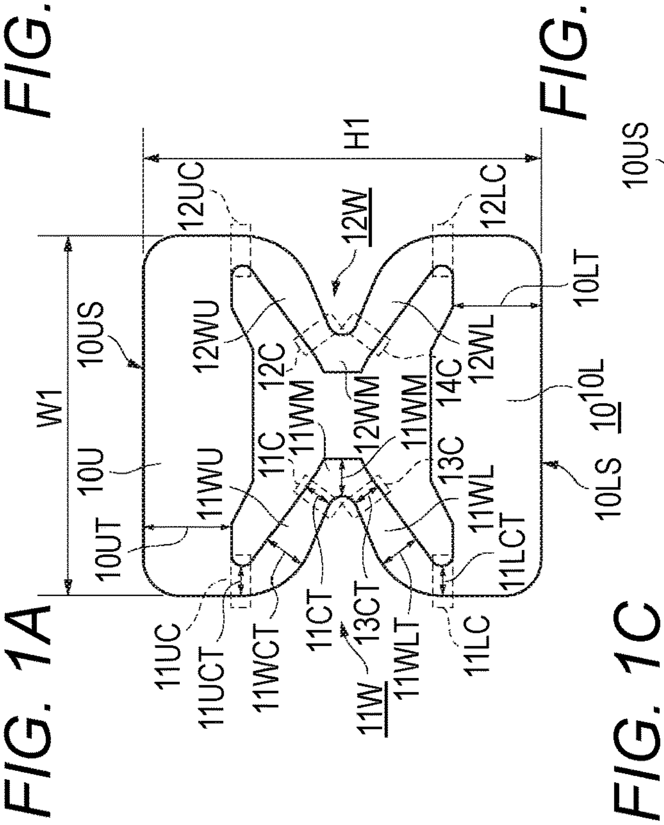
FIG. 1A is a cross-sectional view of a long tube or a tube according to one embodiment taken along a cross section perpendicular to an extending direction.
Figure 1B:
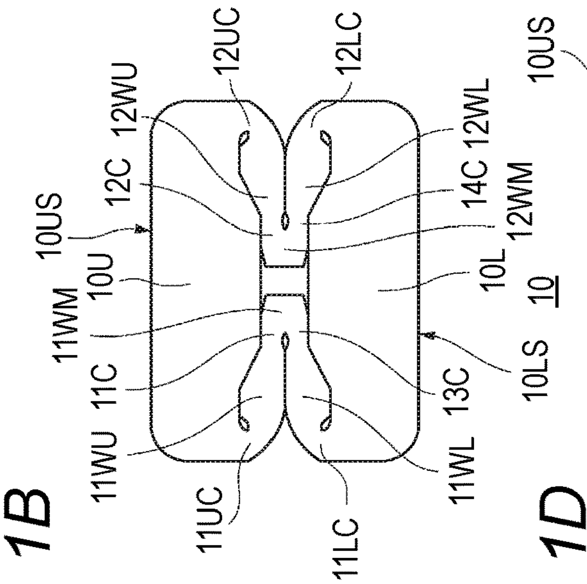
FIG. 1B is a cross-sectional view of along tube or a tube according to one embodiment taken along a cross section perpendicular to an extending direction.
Figure 1C:
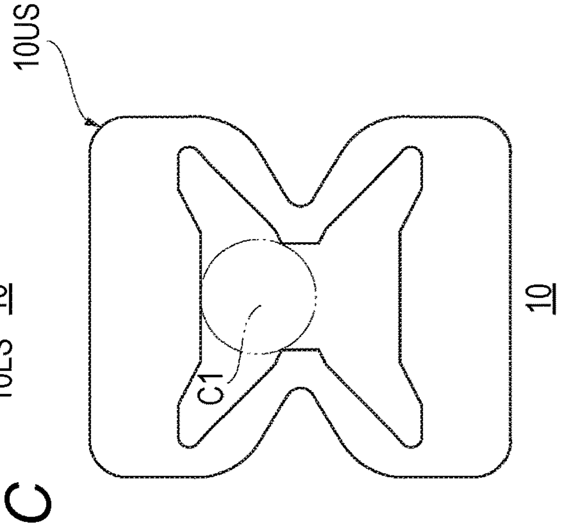
FIG. 1C is a cross-sectional view of a long tube or a tube according to one embodiment taken along a cross section perpendicular to an extending direction.
Figure 1D:
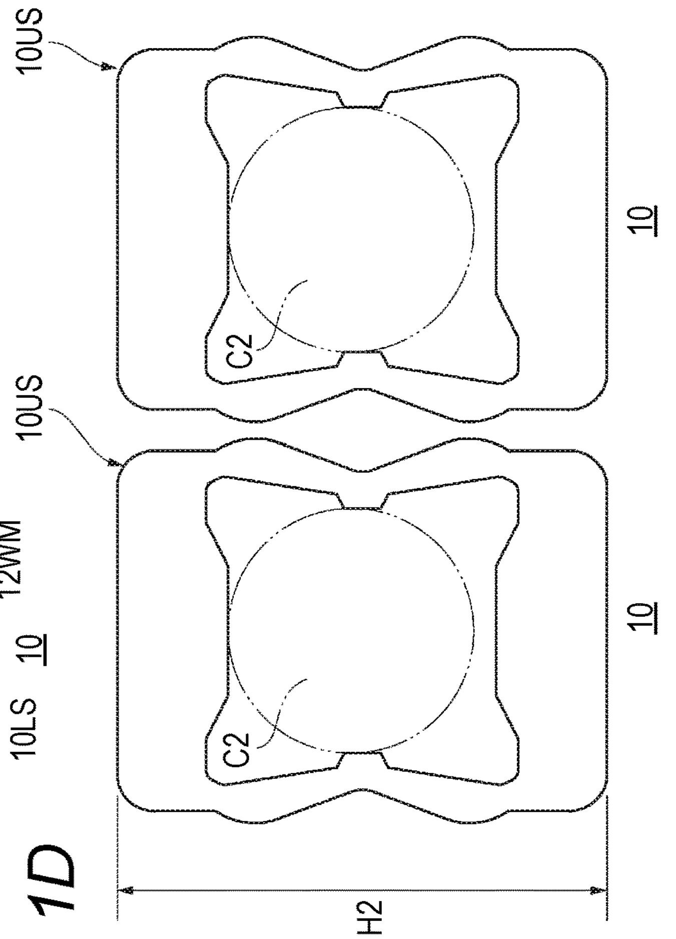
FIG. 1D are cross-sectional views of a long tube or a tube according to one embodiment taken along a cross section perpendicular to an extending direction.

Hereinafter, a configuration of such a long tube 10 will be described. FIG. 1A is a cross-sectional view of the long tube 10 according to the present embodiment taken along the cross section perpendicular to the extending direction of the long tube 10. FIG. 1B shows a cross section of the long tube 10 in a state of being crushed by a pressing member such as a thermal head. FIG. 1C and FIG. 1D show cross sections when a cable C1 and a cable C2, which are linear bodies having different diameters, are inserted into the tube 10. Hereinafter, a state in which an external force (excluding a force such as gravity that is small enough not to deform a shape of the linear body) does not act, an upper portion 10U and a lower portion 10L are separated from each other, and the linear body can be inserted into the region surrounded by the inner wall surface as shown in FIG. 1A is referred to as a normal state or a first state, and a state in which the long tube 10 is crushed by the external force and the upper portion 10U and the lower portion 10L approach each other as shown in FIG. 1B is referred to as a printing state or a second state in some cases. For the purpose of describing a relative positional relationship, a portion including a surface (upper surface 10US) to be printed is referred to as an upper portion (for example, the upper portion 10U) for convenience, a portion supported by a support body such as a platen roller is referred to as a lower portion (for example, the lower portion 10L) for convenience, a direction from the lower portion to the upper portion is referred to as an upper side, and a direction from the upper portion to the lower portion is referred to as a lower side, but an absolute positional relationship is not defined. For example, the lower side does not necessarily indicate a vertical direction.

As shown in FIG. 1A, the long tube 10 includes the upper portion 10U including the printable upper surface 10US, the lower portion 10L opposed to the upper portion 10U, a first upper connection portion 11UC connected to the upper portion 10U, a first lower connection portion 11LC connected to the lower portion 10L, a first side wall 11W connected to the upper portion 10U via the first upper connection portion 11UC and connected to the lower portion 10L via the first lower connection portion 11LC, a second upper connection portion 12UC connected to the upper portion 10U, a second lower connection portion 12LC connected to the lower portion 10L, and a second side wall 12W connected to the upper portion 10U via the second upper connection portion 12UC, connected to the lower portion 10L via the second lower connection portion 12LC, and opposed to the first side wall 11W.

In the present embodiment, the first side wall 11W includes two joint portions, that is, a first joint portion 11C and a third joint portion 13C provided at intermediate points between the upper portion 10U and the lower portion 10L. However, as will be described later, the first side wall 11W may include a single joint portion or three or more joint portions. Similarly, the second side wall 12W includes two joint portions, that is, a second joint portion 12C and a fourth joint portion 14C provided at intermediate points between the upper portion 10U and the lower portion 10L, but may include a single joint portion or three or more joint portions.

The first side wall 11W further includes a first side wall upper portion 11WU provided between the first joint portion 11C and the first upper connection portion 11UC, and a first side wall lower portion 11WL provided between the first joint portion 11C and the first lower connection portion 11LC. In the present embodiment, since the first side wall 11W includes a third joint portion 13C, it can be said that the first side wall lower portion 11WL is provided between the third joint portion 13C and the first lower connection portion 11LC. In addition, the first side wall 11W includes a first side wall middle portion 11WM provided between the first joint portion 11C and the third joint portion 13C.

Similarly, the second side wall 12W includes a second side wall upper portion 12WU provided between the second joint portion 12C and the second upper connection portion 12UC, and a second side wall lower portion 12WL provided between the second joint portion 12C and the second lower connection portion 12LC. In the present embodiment, since the second side wall 12W includes the fourth joint portion 14C, it can also be said that the second side wall lower portion 12WL is provided between the fourth joint portion 14C and the second lower connection portion 12LC. In addition, the second side wall 12W includes a second side wall middle portion 12WM provided between the second joint portion 12C and the fourth joint portion 14C.

The upper portion 10U is a portion including the printable upper surface 10US. As shown in FIG. 1A, in the present embodiment, the upper surface 10US is formed flat, and the upper surface 10US is maintained flat even when the tube 10 is crushed and the upper portion 10U and the lower portion 10L approach each other as shown in FIG. 1B. Therefore, the printing device can preferably perform printing on the upper surface 10US as compared with a surface having irregularities. However, the upper surface 10US may partially or entirely include a concave surface or a convex surface, or may include a concave portion and a convex portion. For example, the upper surface 10US may be formed in a manner of being gently curved so as to be convex upward. Alternatively, the upper surface 10US may be formed in a manner of being gently curved so as to be convex downward. The upper surface 10US may include irregularities in a portion that does not affect the printing.

As shown in FIG. 1A, the upper portion 10U is formed to be thicker than the first side wall 11W and the second side wall 12W. For example, the upper portion 10U may have a wall thickness twice or more a maximum value of a wall thickness of the first side wall 11W and the second side wall 12W (in other words, the first side wall 11W and the second side wall 12W may have the thickness less than half the thickness of the upper portion 10U). By forming the upper portion 10U to be thick (particularly, to be thick in a vertical direction) in this way, even when the upper portion 10U and the lower portion 10L approach each other, the upper portion 10U does not deform greatly compared to other portions. Accordingly, even when the tube 10 is crushed, the upper surface 10US can be maintained flat. In the present embodiment, the upper portion 10U has the thickness equal to or greater than a thickness (wall thickness) 10UT in the vertical direction in the cross section. On the other hand, the first side wall 11W has a maximum thickness (wall thickness) 11WUT (and a thickness 11WLT) in the first side wall upper portion 11WU (and the first side wall lower portion 11WL formed symmetrically with the first side wall upper portion 11WU). Here, the thickness 10UT is twice or more the thickness 11WUT (and the thickness 11WLT). Therefore, even when the tube 10 is crushed and the upper portion 10U and the lower portion 10L approach each other as shown in FIG. 1B, it is possible to prevent the upper surface 10US from being largely twisted due to the first side wall 11W and the second side wall 12W interposed between the upper portion 10U and the lower portion 10L.

The lower portion 10L is a portion supported by the support body such as a platen roller. As shown in FIG. 1A, in the present embodiment, a lower surface 10LS of the lower portion 10L is formed to be flat and parallel to the upper surface 10US, and as shown in FIG. 1B, even when the tube 10 is crushed and the upper portion 10U and the lower portion 10L approach each other, the lower surface 10LS is maintained flat.

In the present embodiment, the upper portion 10U and the lower portion 10L are formed to be vertically symmetrical. Accordingly, the lower portion 10L is formed as thick as the upper portion 10U, and may have, for example, a wall thickness twice or more the maximum value of the wall thickness of the first side wall 11W and the second side wall 12W (in other words, the first side wall 11W and the second side wall 12W may have the thickness less than half the thickness of the lower portion 10L). By forming the lower portion 10L to be thick in this way, the lower portion does not deform greatly as compared with other portions. Accordingly, even when the tube 10 is crushed, the upper surface 10US can be maintained flat. In the present embodiment, the lower portion 10L has the wall thickness equal to or greater than a thickness (wall thickness) 10LT in the vertical direction in the cross section. The thickness 10LT is the same as the thickness 10UT.

The first side wall 11W connects the upper portion 10U and the lower portion 10L, and includes the first joint portion 11C that is bent when the tube 10 is crushed and the upper portion 10U and the lower portion 10L approach each other. The first upper connection portion 11UC corresponds to a portion connecting the first side wall 11W and the upper portion 10U.

As shown by comparing FIG. 1A and FIG. 1B, the first side wall upper portion 11WU provided in a manner of being separated from the upper portion 10U in the normal state (first state) of FIG. 1A is at least partially in contact with an inner wall surface of the upper portion 10U in the printing state (second state) of FIG. 1B. This is because the first upper connection portion 11UC is deformed. More specifically, when a downward external force acts on the upper surface 10US by the pressing member such as a thermal head, the upper portion 10U and the lower portion 10L approach each other, and thus the first side wall 11W (and the second side wall 12W) connecting the upper portion 10U and the lower portion 10L is required to be bent. As shown in FIG. 1B, in the printing state (second state), the first side wall upper portion 11WU changes a direction thereof and extends in a horizontal direction. In order to change the direction of the first side wall upper portion 11WU in this way, the first upper connection portion 11UC is deformed and bent such that a portion on an inner wall surface side is compressed and a portion on an outer wall surface side is elongated. Therefore, the first side wall upper portion 11WU connected to the first upper connection portion 11UC is displaced in a manner of changing the direction thereof and comes into contact with the inner wall surface of the upper portion 10U at least partially. Since the first upper connection portion 11UC functions as a deformable joint portion in this manner, the first upper connection portion 11UC may be referred to as the first upper joint portion 11UC.

As shown in FIG. 1A, in the present embodiment, a wall thickness (wall thickness 11UCT which is determined based on a length of a line segment extending from an inner wall surface to the outer wall surface in the figure and which is, for example, a minimum value of the wall thickness of the first upper connection portion 11UC in the cross section) of the first upper connection portion 11UC in the cross section is smaller than the wall thickness of the upper portion 10U and smaller than the wall thickness of the first side wall upper portion 11WU. In other words, the thickness (wall thickness) 11UCT is smaller than the thickness (wall thickness) 10UT of the upper portion 10U. The thickness (wall thickness) of the first side wall upper portion 11WU is larger than the thickness (wall thickness) 11UCT and smaller than the thickness (wall thickness) 10UT.

With such a configuration, the first upper connection portion 11UC can function as the joint portion that is greatly deformed by the external force. In other words, the upper portion 10U and the first side wall upper portion 11WU corresponding to portions around the first upper connection portion 11UC can function as portions that are only respectively slightly deformed or hardly deformed with respect to the external force.

The first side wall 11W connecting the upper portion 10U and the lower portion 10L is formed to be vertically symmetrical in the present embodiment. The first side wall upper portion 11WU is a wall portion provided between the first joint portion 11C and the first upper connection portion 11UC. When the long tube 10 of the present embodiment is crushed and the upper portion 10U and the lower portion 10L approach each other, the first side wall 11W is bent inward (in a direction approaching the second side wall 12W). In order to bend the first side wall 11W in this manner, the first side wall upper portion 11WU is provided so as to extend in an inclined direction from the first upper connection portion 11UC to the lower portion 10L and the second side wall 12W in the cross section. As a result, the first joint portion 11C is provided at a position closer to the second side wall 12W than the first upper connection portion 11UC and the first lower connection portion 11LC. Accordingly, the first joint portion 11C is provided in a region between the upper portion 10U and the lower portion 10L in the cross section.

The wall thickness of the first side wall upper portion 11WU is larger than the wall thickness 11UCT of the first upper connection portion 11UC and larger than a wall thickness 11CT of the first joint portion 11C. Therefore, it is possible to deform the first upper connection portion 11UC and the first joint portion 11C relatively greatly by the external force, and to deform the first side wall upper portion 11WU relatively slightly.

The first joint portion 11C (an example of a "first side wall joint portion") is a portion that is bent and deformed when the upper portion 10U and the lower portion 10L approach each other. That is, as shown in FIG. 1B, in the printing state (second state), the first side wall 11W can be said to be bent with the first joint portion 11C as a starting point, and thus the first joint portion 11C is bent. As a result, in the printing state (second state), an outer wall surface of the first side wall upper portion 11WU and an outer wall surface of the first side wall lower portion 11WL adjacent to each other with the first joint portion 11C interposed therebetween come into contact with each other.

As shown by a fact that a distance (interval) between the first joint portion 11C and the second joint portion 12C in a left-right direction of a paper plane in the normal state (first state) of FIG. 1A is larger than a distance (interval) between the first joint portion 11C and the second joint portion 12C in the left-right direction of the paper surface in the printing state (second state) of FIG. 1B, the first joint portion 11C is displaced and bent in a direction approaching the second side wall 12W when the upper portion 10U and the lower portion 10L approach each other. More specifically, when the downward external force acts on the upper surface 10US by the pressing member such as a thermal head, the first joint portion 11C is displaced in the direction approaching the second side wall 12W (right direction of the paper plane in FIG. 1A), the first joint portion 11C is deformed such that a portion (including a portion facing the second side wall 12W) on an inner wall surface side is elongated, and a portion (including a portion exposed to an outside) on an outer wall surface side is compressed. In this way, the first joint portion 11C functions as a portion that is bent and deformed. By providing the first joint portion 11C at a predetermined position between an upper portion and a lower portion of the first side wall 11W, the first side wall 11W can be bent at a determined position. Therefore, it is possible to prevent a situation in which the upper surface 10US is shifted to a right or left with respect to the lower surface 10LS in the printing state, and to uniquely determine a cross-sectional shape of the long tube 10 in the printing state shown in FIG. 1B.

For example, the thickness (wall thickness 11CT (an example of a "first thickness") which is determined based on a length of a line segment extending from the inner wall surface to an outer wall surface of the first joint portion 11C in FIG. 1A and which is, for example, a minimum value of the wall thickness of the first joint portion 11C in the cross section) of the first joint portion 11C in the cross section is smaller than the wall thickness of the first side wall upper portion 11WU and smaller than a wall thickness 11WMT of the first side wall middle portion 11WM. Therefore, it is possible to cause the first joint portion 11C to function as a joint portion which is relatively largely deformed by the external force, and to cause the first side wall upper portion 11WU and the first side wall middle portion 11WM to function as non-joint portions which are relatively slightly deformed or hardly deformed.

The first side wall middle portion 11WM connects the first joint portion 11C and the third joint portion 13C. The first side wall middle portion 11WM corresponds to an intermediate portion of the first side wall 11W provided vertically symmetrically in the cross section. As shown in FIG. 1A, an inner wall surface of the first side wall middle portion 11WM includes a portion extending in the vertical direction perpendicular to the upper surface 10US and the lower surface 10LS in the cross section. Therefore, as shown in FIG. 1B, since the inner wall surface of the first side wall middle portion 11WM also includes the portion extending in the vertical direction perpendicular to the upper surface 10US and the lower surface 10LS in the cross section in the printing state, the inner wall surface is compressed in the vertical direction to support the upper portion 10U from below. Therefore, it is possible to prevent deformation of the upper surface 10US when the upper surface 10US is pressed in the printing state. Since the first side wall middle portion 11WM is sandwiched between the upper portion 10U and the lower portion 10L from above and below in this manner, it is possible to uniquely determine the cross-sectional shape of the long tube 10 when the long tube 10 is crushed in the printing state. At this time, the first side wall middle portion 11WM is in contact with a lower surface of the upper portion 10U and an upper surface of the lower portion 10L.

A wall thickness (determined based on a length of a line segment extending from an inner wall surface to an outer wall surface in FIG. 1A, for example, the wall thickness 11WMT) of the first side wall middle portion 11WM in the cross section is larger than the wall thickness 11CT of the first joint portion 11C and larger than a wall thickness 13CT of the third joint portion 13C. Therefore, it is possible to deform the first joint portion 11C and the third joint portion 13C relatively greatly by the external force, and to deform the first side wall middle portion 11WM relatively slightly.

Since the third joint portion 13C, the first side wall lower portion 11WL, and the first lower connection portion 11LC are provided vertically symmetrically with respect to the first joint portion 11C, the first side wall upper portion 11WU, and the first upper connection portion 11UC, respectively, in the cross section, a description thereof will be simplified as follows.

Similarly to the first joint portion 11C, the third joint portion 13C is displaced and bent in the direction approaching the second side wall 12W when the upper portion 10U and the lower portion 10L approach each other. At this time, an inner wall surface side of the third joint portion 13C is elongated, and an outer wall surface side is compressed. Therefore, the first side wall lower portion 11WL provided so as to extend in an inclined direction in the normal state is displaced in the printing state and is at least partially in contact with an inner wall surface of the lower portion 10L in a state of extending in a substantially horizontal direction. A wall thickness (for example, the wall thickness 13CT) of the third joint portion 13C in the cross section is smaller than the wall thickness (for example, the wall thickness 11WLT) of the first side wall lower portion 11WL and smaller than the wall thickness (for example, the wall thickness 11WMT) of the first side wall middle portion 11WM.

The first side wall lower portion 11WL is a wall portion provided between the third joint portion 13C and the first lower connection portion 11LC. In order to bend the first side wall 11W inward, the first side wall lower portion 11WL is provided so as to extend in the inclined direction from the first lower connection portion 11LC to the upper portion 10U and the second side wall 12W in the cross section. As a result, the third joint portion 13C is provided at a position closer to the second side wall 12W than the first upper connection portion 11UC and the first lower connection portion 11LC. Accordingly, the third joint portion 13C is provided in a region between the upper portion 10U and the lower portion 10L in the cross section. The wall thickness (for example, 11WLT) of the first side wall lower portion 11WL is larger than a wall thickness (for example, 11LCT) of the first lower connection portion 11LC and larger than the wall thickness (for example, 11CT) of the first joint portion 11C. Therefore, it is possible to deform the first lower connection portion 11LC and the third joint portion 13C relatively greatly by the external force, and to deform the first side wall upper portion 11WU relatively slightly.

The first lower connection portion 11LC corresponds to a portion connecting the first side wall 11W and the lower portion 10L. When the downward external force acts on the upper surface 10US by the pressing member such as a thermal head, the first lower connection portion 11LC is deformed and bent such that an inner wall surface side thereof is compressed, and an outer wall surface side thereof is elongated. Since the first lower connection portion 11LC functions as the deformable joint portion in this manner, the first lower connection portion 11LC may be referred to as a first lower joint portion.

As shown in FIG. 1A and FIG. 1B, the second upper connection portion 12UC, the second side wall 12W, and the second lower connection portion 12LC are provided laterally symmetrically with respect to the first upper connection portion 11UC, the first side wall 11W, and the first lower connection portion 11LC, respectively, and thus a description thereof will be simplified as follows.

The second upper connection portion 12UC (second upper joint portion) corresponds to a portion connecting the second side wall 12W and the upper portion 10U. When the downward external force acts on the upper surface 10US, the second upper connection portion 12UC is deformed and bent such that an inner wall surface side thereof is compressed, and an outer wall surface side thereof is elongated, and thus the second upper connection portion 12UC may be referred to as the second upper joint portion 12UC. The wall thickness of the second upper connection portion 12UC in the cross section is smaller than the wall thickness of the upper portion 10U and smaller than a wall thickness of the second side wall upper portion 12WU.

The second side wall 12W is formed to be vertically symmetrical in the present embodiment. The second side wall upper portion 12WU is a wall portion provided between the second joint portion 12C and the second upper connection portion 12UC, and is provided so as to extend in an inclined direction from the second upper connection portion 12UC to the lower portion 10L and the first side wall 11W in the cross section. As a result, the second joint portion 12C is provided at a position closer to the first side wall 11W than the second upper connection portion 12UC and the second lower connection portion 12LC. Accordingly, the second joint portion 12C is provided in a region between the upper portion 10U and the lower portion 10L in the cross section. The wall thickness of the second side wall upper portion 12WU is larger than the wall thickness of the second upper connection portion 12UC and larger than a wall thickness of the second joint portion 12C.

The second joint portion 12C (an example of a "second side wall joint portion") is a portion that is bent and deformed when the upper portion 10U and the lower portion 10L approach each other. When the upper portion 10U and the lower portion 10L approach each other, the second joint portion 12C is displaced in a direction (left direction of the paper plane in FIG. 1A) approaching the first side wall 11W, and is bent and deformed such that an inner wall surface side thereof is elongated and an outer wall surface side thereof is compressed. The wall thickness of the second joint portion 12C in the cross section is smaller than the wall thickness of the second side wall upper portion 12WU and smaller than a wall thickness of the second side wall middle portion 12WM.

The second side wall middle portion 12WM connects the second joint portion 12C and the fourth joint portion 14C. The second side wall middle portion 12WM corresponds to an intermediate portion of the second side wall 12W provided vertically symmetrically in the cross section, and an inner wall surface thereof includes a portion extending in the vertical direction perpendicular to the upper surface 10US and the lower surface 10LS in the cross section. Therefore, it is possible to prevent the deformation of the upper surface 10US when the upper surface 10US is pressed in the printing state. The wall thickness of the second side wall middle portion 12WM in the cross section is larger than the wall thickness of the second joint portion 12C and larger than a wall thickness of the fourth joint portion 14C.

Since the fourth joint portion 14C and the second side wall lower portion 12WL are provided vertically symmetrically with respect to the second joint portion 12C and the second side wall upper portion 12WU, respectively, in the cross section, a description thereof will be simplified. When the upper portion 10U and the lower portion 10L approach each other, the fourth joint portion 14C is displaced in a direction approaching the first side wall 11W, and is bent. At this time, an inner wall surface side of the fourth joint portion 14C is elongated, and an outer wall surface side is compressed. Therefore, the second side wall lower portion 12WL provided so as to extend in an inclined direction in the normal state is displaced in the printing state and is at least partially in contact with an inner wall surface of the lower portion 10L in a state of extending in a substantially horizontal direction. The wall thickness of the fourth joint portion 14C in the cross section is smaller than a wall thickness of the second side wall lower portion 12WL and smaller than the wall thickness of the second side wall middle portion 12WM.

The second side wall lower portion 12WL is a wall portion provided between the fourth joint portion 14C and the second lower connection portion 12LC. In order to bend the second side wall 12W inward, the second side wall lower portion 12WL is provided so as to extend in the inclined direction from the second lower connection portion 12LC to the upper portion 10U and the first side wall 11W in the cross section. As a result, the fourth joint portion 14C is provided at a position closer to the first side wall 11W than the second upper connection portion 12UC and the second lower connection portion 12LC. Accordingly, the fourth joint portion 14C is provided in a region between the upper portion 10U and the lower portion 10L in the cross section. A wall thickness of the second side wall lower portion 12WL is larger than a wall thickness of the second lower connection portion 12LC and larger than the wall thickness of the fourth joint portion 14C.

The second lower connection portion 12LC (second lower joint portion) corresponds to a portion connecting the second side wall 12W and the lower portion 10L. When the downward external force acts on the upper surface 10US by the pressing member such as a thermal head, the second lower connection portion 12LC is deformed such that an inner wall surface side is compressed and an outer wall surface side is elongated.

With the configuration described above, gaps are provided between the first side wall upper portion 11WU (second side wall upper portion 12WU) and the upper portion 10U, between the first side wall lower portion 11WL (second side wall lower portion 12WL) and the lower portion 10L, and between the first side wall upper portion 11WU (second side wall upper portion 12WU) and the first side wall lower portion 11WL (second side wall lower portion 12WL) in the normal state, and in the first side wall 11W (second side wall 12W), which is bent inward in a V shape and provided upright from the lower portion 10L, the first upper connection portion 11UC (second upper connection portion 12UC), the first lower connection portion 11LC (second lower connection portion 12LC), the first joint portion 11C (second joint portion 12C), and the third joint portion 13C (fourth joint portion 14C) are bent and deformed in the printing state. As a result, the inner wall surface of the first side wall upper portion 11WU (second side wall upper portion 12WU) and the inner wall surface of the upper portion 10U are in contact with each other, the outer wall surface of the first side wall upper portion 11WU (second side wall upper portion 12WU) and the outer wall surface of the first side wall lower portion 11WL (second side wall lower portion 12WL) are in contact with each other, the inner wall surface of the first side wall lower portion 11WL (second side wall lower portion 12WL) and the inner wall surface of the lower portion 10L are in contact with each other, and the upper portion 10U and the lower portion 10L approach each other while maintaining substantially the same shape in the cross section.

By setting the wall thicknesses of determined portions (first upper connection portion 11UC, second upper connection portion 12UC, first lower connection portion 11LC, second lower connection portion 12LC, and first joint portion 11C to fourth joint portion 14C) smaller than a wall thickness of a peripheral portion so as to deform the determined portions at determined positions as described above, the first side wall 11W (second side wall 12W) can be bent at a determined position against the external force. Therefore, even if uneven winding or a manufacturing error occurs when a long tube is wound around the drum or the like, by bending the predetermined portions, it is possible to prevent the situation in which the upper surface 10US is shifted to the right or left with respect to the lower surface 10LS in the printing state, and to uniquely determine the cross-sectional shape of the long tube 10 in the printing state.

As shown in FIG. 1A, in the normal state (first state), the first side wall 11W and the second side wall 12W are erected from the lower portion 10L and support the upper portion 10U. Therefore, the upper portion 10U and the lower portion 10L are largely separated from each other, and a region (that is, a region surrounded by the inner wall surface of the long tube 10) surrounded by inner wall surfaces of the upper portion 10U, the lower portion 10L, the first side wall 11W, and the second side wall 12W has a sufficient size. Accordingly, the linear body having a sufficient size can be inserted into the long tube 10.

On the other hand, as shown in FIG. 1B, in the printing state (second state), the inner wall surface of the first side wall upper portion 11WU and the inner wall surface of the upper portion 10U contact each other, the outer wall surface of the first side wall upper portion 11WU and the outer wall surface of the first side wall lower portion 11WL contact each other, and the inner wall surface of the first side wall lower portion 11WL and the inner wall surface of the lower portion 10L contact each other. Therefore, even if the downward external force acts on the upper surface 10US by the pressing member such as a thermal head, the first side wall 11W and the second side wall 12W support the upper portion 10U. As a result, since the deformation of the upper surface 10US in the printing state is prevented, it is possible to suitably perform the printing on a printing region of the upper surface 10US.

In addition, in the long tube 10 of the present embodiment, the region surrounded by the inner wall surfaces is provided laterally symmetrically in the cross section. In addition, the first side wall 11W and the second side wall 12W are also provided laterally symmetrically. Therefore, it is possible to prevent the situation in which the upper surface 10US is shifted to the right or left with respect to the lower surface 10LS in the printing state. Since the first side wall 11W and the second side wall 12W are provided laterally symmetrically, the linear body can be supported at a center of the tube 10 in the left-right direction when the linear body is inserted, and thus identification information printed on the linear body can be easily visually recognized. Further, even in a case where linear bodies are inserted into a plurality of the tubes 10 and arranged adjacent to one another, the plurality of tubes 10 can be aligned, and thus each piece of identification information printed on the linear bodies can be easily visually recognized, and an appearance is improved.

Further, in the long tube 10 of the present embodiment, the region surrounded by the inner wall surfaces is provided vertically symmetrically in the cross section. With such a configuration, it is possible to prevent the long tube 10 from being erroneously mounted on the printing device upside down.

FIG. 1C is a cross-sectional view showing a state in which the linear body C1 having a relatively small diameter is inserted, and FIG. 1D are cross-sectional views showing a state in which the linear body C2 having a relatively large diameter is inserted.

As shown in these drawings, the first side wall 11W is bent inward at an intermediate portion (in the vicinity of the first joint portion 11C, the first side wall middle portion 11WM, and the third joint portion 13C) between the upper portion 10U and the lower portion 10L, and corresponds to a portion closest to a central axis (center of the region surrounded by the upper portion 10U, the lower portion 10L, the first side wall 11W, and the second side wall 12W) of the long tube 10. Similarly, the second side wall 12W is bent inward at an intermediate portion (in the vicinity of the second joint portion 12C, the second side wall middle portion 12WM, and the fourth joint portion 14C) between the upper portion 10U and the lower portion 10L, and similarly corresponds to a portion closest to the central axis. Therefore, the long tube 10 is configured such that intermediate portions of the first side wall 11W and the second side wall 12W are in contact with the linear body when the linear body is inserted, and the linear body can be elastically supported.

As shown in FIG. 1C, when the linear body C1 having the relatively small diameter is inserted, the linear body C1 is supported in contact with the lower surface of the upper portion 10U (or the upper surface of the lower portion 10L), the intermediate portion of the first side wall 11W, and the intermediate portion of the second side wall 12W.

As shown in FIG. 1D, when the linear body C2 having the relatively large diameter is inserted, the linear body C2 is supported in contact with the lower surface of the upper portion 10U (or the upper surface of the lower portion 10L), the intermediate portion of the first side wall 11W, and the intermediate portion of the second side wall 12W. At this time, the first upper connection portion 11UC, the first joint portion 11C, and the first lower connection portion 11LC of the first side wall 11W are configured to be deformable in directions opposite to those in the printing state. Therefore, the upper portion 10U and the lower portion 10L are further separated from each other as compared with the first state, and a distance between the upper surface 10US and the lower surface 10LS is larger than a distance between the upper surface 10US and the lower surface 10LS in the second state (hereinafter, a state in which the distance between the upper surface 10US and the lower surface 10LS becomes larger than the distance between the upper surface 10US and the lower surface 10LS in the second state by inserting the linear body C2 having the large diameter in this manner may be referred to as a “third state”). Since the first side wall 11W and the second side wall 12W are formed laterally symmetrically, the first side wall 11W and the second side wall 12W are similarly elongated by being pressed by side surfaces of the linear body C2. In addition, the vicinity of a central portion of a lower surface of the upper surface 10US is pushed up by an upper surface of the linear body C2. Therefore, even in the third state, the upper surface 10US can be maintained flat.

With such a configuration, the long tube 10 can support the linear body C2 having the large diameter. In particular, since the first side wall 11W and the second side wall 12W extend vertically, an elastic force is generated in a compression direction, so that a gripping force can be increased. Since the first side wall 11W and the second side wall 12W extend vertically, the upper surface 10US can be maintained flat.

[Regarding Cross-Sectional Shape]

Furthermore, the long tube 10 according to the present embodiment additionally includes the following configuration.

That is, the long tube 10 has a quadrangular (square or vertically long rectangular) cross-sectional configuration. For example, as shown in FIG. 1A, the upper surface 10US and the lower surface 10LS of the long tube 10 in the normal state may include flat surfaces parallel to each other in the cross section, and a distance H1 (height of the long tube 10) between the upper surface 10US and the lower surface 10LS in the cross section may be 80% or more of a width W1 of the upper surface 10US in the cross section.

According to such a configuration, when the linear bodies C2 are inserted into a plurality of the tubes 10 and arranged adjacent to one another as shown in FIG. 1D, even if a certain tube 10 attempts to rotate about the inserted linear body C2, the tube 10 collides with the first side wall 11W or the second side wall 12W of another tube 10 adjacent thereto, and thus it is possible to prevent the rotation of the tube 10. Therefore, the plurality of tubes 10 can be arranged such that the upper surfaces 10US of the plurality of tubes 10 face the same direction. In addition, when each upper surface 10US includes the flat surface, since the identification information of the plurality of tubes 10 is displayed on substantially the same plane, it is possible to easily identify each linear body as compared with the related art.

Further, the long tube 10 of the present embodiment is configured such that the upper surface 10US is flat in the cross section in the first state in which a large external force does not act on the long tube 10 as shown in FIG. 1A, and the upper surface 10US is substantially flat in the cross section in the second state in which the upper portion 10U and the lower portion 10L approach each other due to the large downward external force acting on the upper surface 10US of the long tube 10. As one specific example for achieving such a configuration, the long tube 10 of the present embodiment has a configuration in which a convex portion protruding slightly downward is provided in a center of the lower surface of the upper portion 10U, a convex portion protruding slightly upward is provided in a center of the upper surface of the lower portion 10L, and in the second state, the convex portion provided on the upper portion 10U is in contact with the first joint portion 11C and the second joint portion 12C, and the convex portion provided on the lower portion 10L is in contact with the third joint portion 13C and the fourth joint portion 14C. With such a configuration, it is possible to uniquely determine the cross-sectional shape of the long tube 10 when the long tube 10 is crushed in the printing state.

As described above, according to the present embodiment, it is possible to provide a long tube in which a position of an upper portion when the long tube is crushed is uniquely determined with respect to a position of a lower portion (a shift in a left-right direction is small).

However, the long tube can be variously modified. For example, a first side wall may not include a third joint portion and a first side wall middle portion, and a second side wall may not include a fourth joint portion and a second side wall middle portion. In this case, for example, the first side wall may include a first joint portion at an intermediate portion between an upper portion and a lower portion, and the second side wall may include a second joint portion at the intermediate portion between the upper portion and the lower portion. Alternatively, each of the first side wall and the second side wall may include three or more joint portions. Alternatively, the first side wall joint portion may be located outside a first upper joint portion and a first lower joint portion, and may be configured to bend the first side wall outward. Here, "outward" refers to a direction from an outer wall of a tube toward an outside, "outward with respect to the first side wall" includes a direction away from the second side wall, and "outward with respect to the second side wall" includes a direction away from the first side wall.

In addition, the joint portion may be achieved by a method other than a method of reducing a wall thickness. For example, the joint portion may be provided by cutting a notch. For example, the joint portion may be provided by forming a through hole or a through groove. For example, the joint portion may be provided by forming the joint portion using a material having an elastic modulus smaller than an elastic modulus of a material of a peripheral portion. By forming the joint portion using the material having the elastic modulus smaller than the elastic modulus of the material of the peripheral portion, it is possible to promote deformation by the joint portion even if the joint portion and the peripheral portion have the same wall thickness. In addition, the joint portion may be provided by a method described in other embodiments to be described later.

Second Embodiment

Figure 2C:
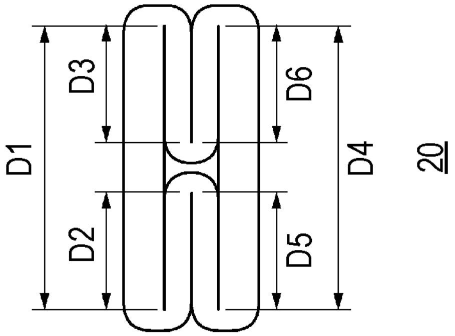
FIG. 2C is a cross-sectional view of a long tube according to another embodiment taken along a cross section perpendicular to an extending direction.
Figure 2B:
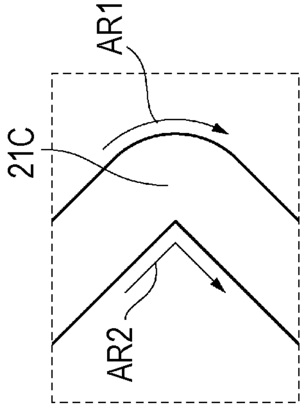
FIG. 2B is a cross-sectional view of a long tube according to another embodiment taken along a cross section perpendicular to an extending direction.
Figure 2A:
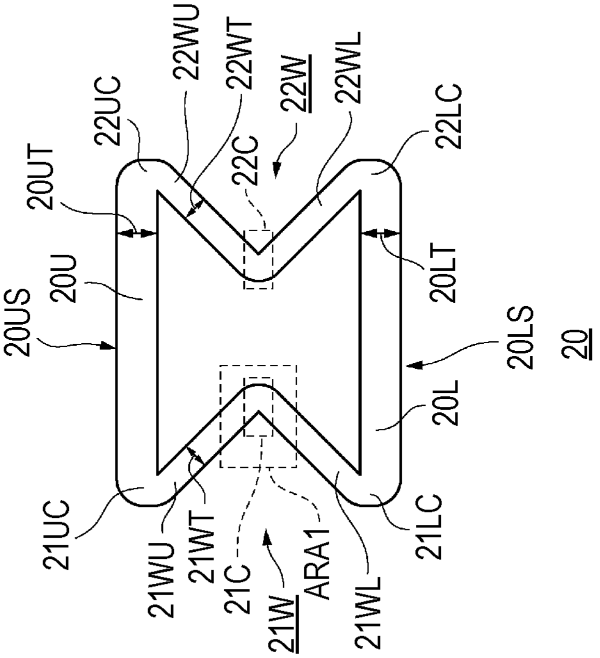
FIG. 2A is a cross-sectional view of a long tube according to another embodiment taken along a cross section perpendicular to an extending direction.

FIG. 2A shows a cross section of a long tube 20 according to the present embodiment in a first state, and FIG. 2B shows a cross section of the long tube 20 in a second state. Components having the same or similar functions or configurations described in other embodiments will be denoted by the same names, and a detailed description thereof will be omitted. Descriptions of functions and effects that are understood to be exhibited in the same manner as those described in the other embodiments will be omitted or simplified, and different portions will be mainly described (the descriptions are similarly omitted or simplified in the other embodiments).

Similarly to the long tube 10, the long tube 20 according to the present embodiment is formed of an elastic material, and is used in an application in which characters or the like are printed on a surface in a state in which the long tube 20 is crushed by a pressing member such as a thermal head, and then a linear body is inserted into a region surrounded by inner wall surfaces to distinguish the linear body from other linear bodies (long tubes according to other embodiments are also used in the same application, and thus a description thereof is omitted).

Similarly to the long tube 10, the long tube 20 includes an upper portion 20U including a printable upper surface 20US, a lower portion 20L including a lower surface 20LS, a first upper connection portion (first upper joint portion) 21UC connected to the upper portion 20U, a first lower connection portion (first lower joint portion) 21LC connected to the lower portion 20L, a first side wall 21W connected to the upper portion 20U via the first upper connection portion 21UC, connected to the lower portion 20L via the first lower connection portion 21LC, and including a first joint portion 21C that is bent and deformed when the upper portion 20U and the lower portion 20L approach each other, a second upper connection portion (second upper joint portion) 22UC connected to the upper portion 20U, a second lower connection portion (second lower joint portion) 22LC connected to the lower portion 20L, and a second side wall 22W connected to the upper portion 20U via the second upper connection portion 22UC, connected to the lower portion 20L via the second lower connection portion 22LC, and including a second joint portion 22C that is bent and deformed when the upper portion 20U and the lower portion 20L approach each other.

Further, the long tube 20 is similar to the long tube 10 in that the first joint portion 21C is configured to be displaced in a direction approaching the second side wall 22W and bent at a predetermined position between the upper portion 20U and the lower portion 20L, the second joint portion 22C is configured to be displaced in a direction approaching the first side wall 21W and bent at a predetermined position between the upper portion 20U and the lower portion 20L when the upper portion 20U and the lower portion 20L approach each other, a first side wall upper portion 21WU (second side wall upper portion 22WU) is provided so as to extend in an inclined direction from the first upper connection portion 21UC (second upper connection portion 22UC) to the lower portion 20L and the second side wall 22W (first side wall 21W) in the cross section, and a first side wall lower portion 21WL (second side wall lower portion 22WL) is provided so as to extend in an inclined direction from the first lower connection portion 21LC (second lower connection portion 22LC) to the upper portion 20U and the second side wall 22W (first side wall 21W) in the cross section.

However, the long tube 20 differs from the long tube 10 in which each side wall includes the plurality of joint portions in that the first side wall 21W includes the first joint portion 21C, which is a single joint portion, at an intermediate point between the upper portion 20U and the lower portion 20L, and the second side wall 22W includes the second joint portion 22C, which is a single joint portion, at an intermediate point between the upper portion 20U and the lower portion 20L.

Further, the long tube 20 differs from the long tube 10 including the side walls provided with the joint portions by setting the wall thicknesses thereof different from each other in that the first side wall 21W and the second side wall 22W have substantially equal wall thicknesses (thicknesses in the cross section) 21WT and 22WT. However, the long tube 20 is common to the long tube 10 in that the wall thickness 21WT and the wall thickness 22WT are set smaller than a wall thickness 20UT of the upper portion 20U in the cross sections and a wall thickness 20LT of the lower portion 20L in the vertical direction in the cross section.

The long tube 20 according to the present embodiment is provided with a joint portion in which an extremely small R is formed by reducing a curvature radius of a portion to be bent (including cutting a notch such as an edge in the portion to be bent).

FIG. 2B is an enlarged view of a region ARA1 including the first joint portion 21C in FIG. 2A. The first joint portion 21C is formed to have different curvature radii on an inner wall surface side and an outer wall surface side. The first joint portion 21C is curved and formed such that a curvature radius R1 along an inner wall surface has a relatively large value as indicated by an arrow AR1 in FIG. 1B. On the other hand, the first joint portion 21C is bent and formed such that a curvature radius along an outer wall surface has a discontinuous curvature or a value sufficiently smaller than the curvature radius R1 by providing an edge (notch) as indicated by an arrow AR2 in FIG. 1B.

Similarly, the second joint portion 22C is formed in a manner of being curved in a portion along an inner wall surface so that a curvature radius R1 along the inner wall surface has a relatively large value, and on the other hand, the second joint portion 22C is formed in a manner of being bent in a portion along an outer wall surface so that a curvature radius along the outer wall surface has a discontinuous curvature or a sufficiently smaller value than the curvature radius R1 by providing an edge (notch).

Further, the first upper connection portion 21UC, the first lower connection portion 21LC, the second upper connection portion 22UC, and the second lower connection portion 22LC are each also formed such that a curvature radius of a portion on an inner wall side to be bent is small. That is, each of the first upper connection portion 21UC, the first lower connection portion 21LC, the second upper connection portion 22UC, and the second lower connection portion 22LC is formed in a manner of being curved along the inner wall surface with a curvature radius equal to or greater than a first curvature radius R1 in the cross section, and is formed to have a relatively small curvature radius less than the first curvature radius R1 along the outer wall surface.

According to the above configuration, the first side wall 21W and the second side wall 22W can be bent at determined positions against an external force in the same way as if a notch is cut to cut down a piece of wood so that the piece of wood falls down in a predetermined direction. Therefore, it is possible to prevent a situation in which the upper surface 20US is shifted to a right or left with respect to the lower surface 20LS in a printing state, and to uniquely determine a cross-sectional shape of the long tube 20 in the printing state.

FIG. 2B shows a cross section of the long tube 20 in a state (second state) in which the long tube 20 is crushed by the pressing member such as a thermal head. As shown in the same figure, in the printing state, an inner wall surface of the first side wall upper portion 21WU (second side wall upper portion 22WU) and an inner wall surface of the upper portion 20U are in contact with each other, an outer wall surface of the first side wall upper portion 21WU (second side wall upper portion 22WU) and an outer wall surface of the first side wall lower portion 21WL (second side wall lower portion 22WL) are in contact with each other, an inner wall surface of the first side wall lower portion 21WL (second side wall lower portion 22WL) and an inner wall surface of the lower portion 20L are in contact with each other, and the upper portion 20U and the lower portion 20L approach each other while maintaining substantially the same shape in the cross section. Since the first side wall 21W and the second side wall 22W of the long tube 20 have substantially the same thickness, the upper surface 20US is maintained flat even when the long tube 20 is crushed and the upper portion 20U and the lower portion 20L approach each other. Therefore, a printing device can perform printing more suitably on the upper surface 20US than on a surface having irregularities.

[Regarding Distance Relationship between Joint Portions]

Furthermore, the long tube 20 according to the present embodiment additionally includes the following configuration.

That is, in the cross section of the long tube 20, the long tube 20 is configured such that a value (D1−(D2+D3)) obtained by subtracting, from a distance D1 between a first upper joint portion 21UC and a second upper joint portion 22UC, a value (D2+D3) which is a sum of a distance D2 between the first joint portion 21C and the first upper joint portion 21UC and a distance D3 between the second joint portion 22C and the second upper joint portion 22UC is the same as a value (D4−(D5+D6)) obtained by subtracting, from a distance D4 between a first lower joint portion 21LC and a second lower joint portion 22LC, a value (D5+D6) which is a sum of a distance D5 between the first joint portion 21C and the first lower joint portion 21LC and a distance D6 between the second joint portion 22C and the second lower joint portion 22LC. That is, a relational expression is (D1−(D2+D3))=(D4−(D5+D6)) (hereinafter, referred to as a "first relational expression").

Here, as shown in FIG. 2C, the distances D1 to D6 are measured based on horizontal distances between the joint portions in the second state in which the upper portion 20U and the lower portion 20L approach each other when the long tube 20 is crushed by the external force.

The inventors of the present application have focused on a point that the upper surface 20US can be prevented from being curved in the printing state by satisfying the above-described first relational expression. That is, the value (D1−(D2+D3)) obtained by subtracting, from the distance D1, the value (D2+D3) that is the sum of the distance D2 and the distance D3 corresponds to an interval (distance) between the first side wall upper portion 21WU and the second side wall upper portion 22WU in the second state. The value (D4−(D5+D6)) obtained by subtracting, from the distance D4, the value (D5+D6) that is the sum of the distance D5 and the distance D6 corresponds to an interval (distance) between the first side wall lower portion 21WL and the second side wall lower portion 22WL in the second state.

Therefore, when the both values are greatly different from each other, the upper surface 20US is curved in the second state. For example, when the value (D4−(D5+D6)) is larger than the value (D1−(D2+D3)), the upper surface 20US is recessed downward.

Therefore, the upper surface 20US can be prevented from being curved in the printing state by providing the joint portions at positions satisfying the above-described first relational expression. For example, even when the distance D2 and the distance D5 are different as a result of a length of the first side wall upper portion 21WU (second side wall upper portion 22WU) and a length of the first side wall lower portion 21WL (second side wall lower portion 22WL) being different from each other, or even when the distance D1 and the distance D4 are different as a result of a width of the upper portion 20U and a width of the lower portion 20L being different from each other, or even when the distance D5 and the distance D6 are different and heights of the first joint portion 21C and the second joint portion 22C are different from each other as a result of the length of the first side wall lower portion 21WL and a length of the second side wall lower portion 22WL being different from each other, the upper surface 20US can be prevented from being curved in the printing state when the above-described first relational expression is satisfied.

For example, in the long tube 20 or the like shown in the present embodiment, the first upper joint portion 21UC is provided directly above the first lower joint portion 21LC, and similarly, the second upper joint portion 22UC is provided directly above the second lower joint portion 22LC. However, even if the first upper joint portion 21UC and the second upper joint portion 22UC are provided at different positions in a horizontal direction instead of being provided directly above the first lower joint portion 21LC and the second lower joint portion 22LC, respectively, the cross-sectional shape of the long tube 20 in the printing state can be uniquely determined as long as the above-described first relational expression is satisfied in a long tube of a type that bends inward.

Furthermore, the long tube 20 according to the present embodiment additionally has the following configuration independently of the distance relationship described above.

That is, the long tube 20 is configured such that, in the cross section of the long tube 20, the distance D1 between the first upper joint portion 21UC and the second upper joint portion 22UC is the same as the distance D4 between the second joint portion 22C and the second upper joint portion 22UC, the distance D2 between the first joint portion 21C and the first upper joint portion 21UC, the distance D3 between the second joint portion 22C and the second upper joint portion 22UC, the distance D5 between the first joint portion 21C and the first lower joint portion 21LC, and the distance D6 between the second joint portion 22C and the second lower joint portion 22LC are the same, and the distance D2 is 50% or less of the distance D1. That is, a relational expression is $D2=D3=D5=D6\leq(D1/2)=(D4/2)$ (hereinafter, referred to as a "second relational expression").

Here, as shown in FIG. 2C, the distances D1 to D6 are measured based on the horizontal distances between the joint portions in the second state in which the upper portion 20U and the lower portion 20L approach each other when the long tube 20 is crushed by the external force.

The inventors of the present application have focused on the point that the upper surface 20US can be prevented from being curved in the printing state by providing the joint portions at the positions satisfying the second relational expression. That is, by setting the distance D1 and distance D4 to be the same, and setting the distances D2, D3, D5, and D6 to be the same, it is possible to enhance symmetry of a region surrounded by the upper portion 20U, the lower portion 20L, the first side wall 21W, and the second side wall 22W. In addition, since the distance D2 and the distance D3 are each 50% or less of the distance D1, in the second state, the first side wall upper portion 21WU and the second side wall upper portion 22WU do not come into contact with each other, or even if they come into contact with each other, end portions only come into contact with each other. Therefore, it is possible to prevent a situation in which the upper surface 20US is largely deformed due to collision between the first side wall upper portion 21WU and the second side wall upper portion 22WU in the second state.

Similarly, since the distance D5 and the distance D6 are each 50% or less of the distance D4, it is possible to prevent a situation in which the upper surface 20US is greatly deformed due to collision between the first side wall lower portion 21WL and the second side wall lower portion 22WL in the second state.

The distances D2, D3, D5, and D6 are preferably 30% or more (50% or less) of the distance D1 and the distance D4. With such a configuration, the first side wall 21W and the second side wall 22W can suitably support the upper portion 20U.

According to the long tube 20 as described above, by providing portions having a small curvature are provided at predetermined positions (first upper connection portion 21UC, second upper connection portion 22UC, first lower connection portion 21LC, second lower connection portion 22LC, first joint portion 21C, and second joint portion 22C), the first side wall 21W and the second side wall 22W can be bent at the positions against the external force. Therefore, it is possible to prevent the situation in which the upper surface 20US is shifted to the right or left with respect to the lower surface 20LS in the printing state, and it is possible to uniquely determine the cross-sectional shape of the long tube 20 in the printing state.

In the long tube 20, since wall thicknesses of the first side wall 21W and the second side wall 22W are substantially the same, it is possible to prevent a situation in which the upper surface 20US is greatly undulated due to a change in the film thickness of the first side wall 21W or the like in the second state. However, similarly to the long tube 10, wall thicknesses of the joint portions may be set smaller than that of peripheral portions to make the joint portions more easily deformable. Similar to the long tube 10, a plurality of types of linear bodies having different diameters can be inserted into the long tube 20. When the linear body C2 having the large diameter is inserted into a tube formed by separating the long tube 20, the first side wall 21W and the second side wall 22W extend in the vertical direction, and a distance between the upper surface 20US and the lower surface 20LS is larger than a distance in the first state.

Third Embodiment

Figure 3A:
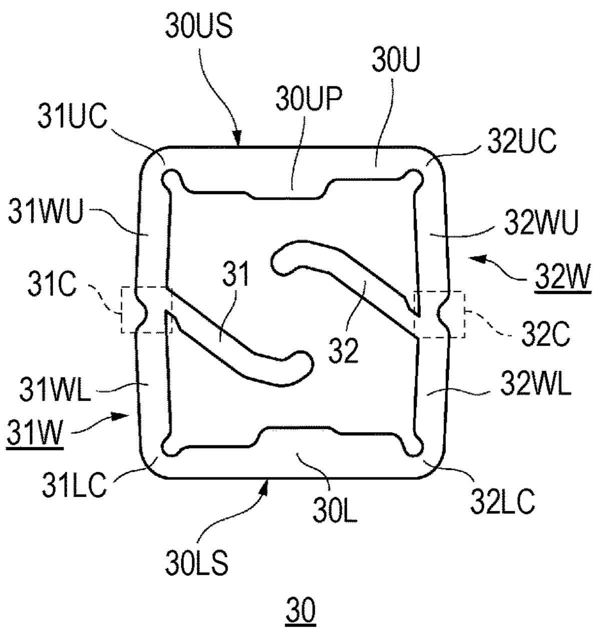
FIG. 3A is a cross-sectional view of a long tube or a tube according to another embodiment taken along a cross section perpendicular to an extending direction.
Figure 3B:
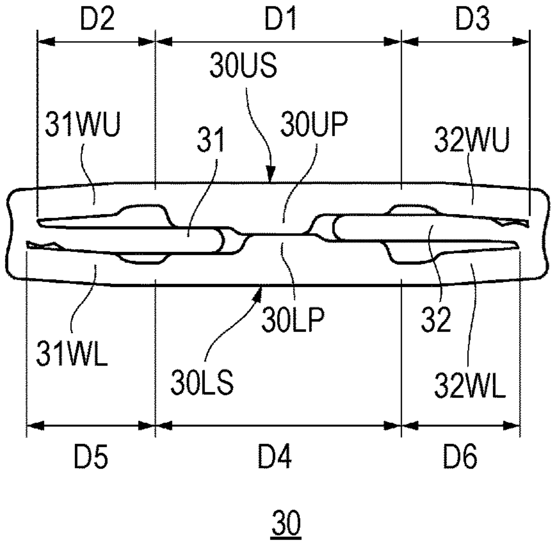
FIG. 3B is a cross-sectional view of a long tube or a tube according to another embodiment taken along a cross section perpendicular to an extending direction.

FIG. 3A shows a cross section of a long tube 30 according to the present embodiment in a first state, and FIG. 3B shows a cross section of the long tube 30 in a second state.

Similarly to the long tube 10, the long tube 30 includes an upper portion 30U including a printable upper surface 30US, a lower portion 30L including a lower surface 30LS, a first upper connection portion (first upper joint portion) 31UC connected to the upper portion 30U, a first lower connection portion (first lower joint portion) 31LC connected to the lower portion 30L, a first side wall 31W connected to the upper portion 30U via the first upper connection portion 31UC, connected to the lower portion 30L via the first lower connection portion 31LC, and including a first joint portion 31C that is bent and deformed when the upper portion 30U and the lower portion 30L approach each other, a second upper connection portion (second upper joint portion) 32UC connected to the upper portion 30U, a second lower connection portion (second lower joint portion) 32LC connected to the lower portion 30L, and a second side wall 32W connected to the upper portion 30U via the second upper connection portion 32UC, connected to the lower portion 30L via the second lower connection portion 32LC, and including a second joint portion 32C that is bent and deformed when the upper portion 30U and the lower portion 30L approach each other.

Further, as shown in FIG. 3A, wall thicknesses of the first upper connection portion 31UC, the first lower connection portion 31LC, the second upper connection portion 32UC, the second lower connection portion 32LC, the first joint portion 31C, and the second joint portion 32C (first upper connection portion 31UC and the like) in a cross section are formed to be smaller than wall thicknesses of the upper portion 30U, the lower portion 30L, a first side wall upper portion 31WU, a first side wall lower portion 31WL, a second side wall upper portion 32WU, and a second side wall lower portion 32WL (upper portion 30U and the like) which are peripheral portions, so that it is possible to cause the first upper connection portion 31UC and the like to function as joint portions which are relatively largely deformed by an external force, and to cause the upper portion 30U and the like to function as non-joint portions which are relatively slightly deformed or hardly deformed.

However, unlike the long tube 10, the first side wall 31W includes the first joint portion 31C, which is a single joint portion, at an intermediate point between the upper portion 30U and the lower portion 30L, and the second side wall 32W includes the second joint portion 32C, which is a single joint portion, at an intermediate point between the upper portion 30U and the lower portion 30L.

Further, unlike the long tube 10, the first side wall 31W and the second side wall 32W stand substantially vertically from the lower portion 30L to support the upper portion 30U. In addition, the wall thicknesses of the first joint portion 31C and the second joint portion 32C are reduced by providing concave portions recessed inward on outer wall surfaces of the first joint portion 31C and the second joint portion 32C.

As shown in FIG. 3B, the long tube 30 differs from the long tube 10 in which the first side wall 11W and the second side wall 12W are bent inward in that the first side wall 31W and the second side wall 32W of the long tube 30 are bent so as to spread outward by such a configuration. Specifically, the first joint portion 31C is displaced in a direction away from the second side wall 32W and bent when the upper portion 30U and the lower portion 30L approach each other, and the second joint portion 32C is displaced and bent in a direction away from the first side wall 31W when the upper portion 30U and the lower portion 30L approach each other.

Furthermore, the long tube 30 also differs from the long tube 10 in that the long tube 30 includes a first contact piece 31 and a second contact piece 32 which are two contact pieces that protrude from a region surrounded by the upper portion 30U, the lower portion 30L, the first side wall 31W, and the second side wall 32W, and grip a linear body by being elastically deformed and brought into contact with the linear body when the linear body is inserted.

In the long tube 30 of a type in which the first side wall 31W and the second side wall 32W are bent so as to spread outward, since it is difficult to support the linear body by the first side wall 31W and the second side wall 32W, it is preferable to provide a contact piece. The number of contact pieces may be one or three or more. The contact piece may be provided so as to protrude from an inner wall surface of the upper portion 10U or the lower portion 10L.

As shown in FIG. 3B, since the first side wall 31W and the second side wall 32W are bent so as to spread outward, the long tube 30 is configured such that an inner wall surface of the first side wall upper portion 31WU and an inner wall surface of the first side wall lower portion 31WL are in contact with each other, an inner wall surface of the second side wall upper portion 32WU and an inner wall surface of the second side wall lower portion 32WL are in contact with each other, and the upper portion 30U and the lower portion 30L of the long tube 30 are in contact with each other in the second state. Since the first side wall 31W and the second side wall 32W are not presented between the upper portion 30U and the lower portion 30L, it is possible to promote thinning of the long tube 30 in the second state. Therefore, deformation of the upper surface 30US when pressed by a thermal head can be prevented.

In the present embodiment, the upper portion 30U and the lower portion 30L are in contact with each other while sandwiching the first contact piece 31 and the second contact piece 32 from above and below in the second state. Further, the upper portion 30U includes a convex portion 30UP protruding downward on an lower surface, and the lower portion 30L includes a convex portion 30LP protruding upward on an upper surface, and the convex portion 30UP and the convex portion 30LP are configured to come into contact with each other in the second state. With such a configuration, it is possible to stably support the upper surface 30US.

Figure 3C:
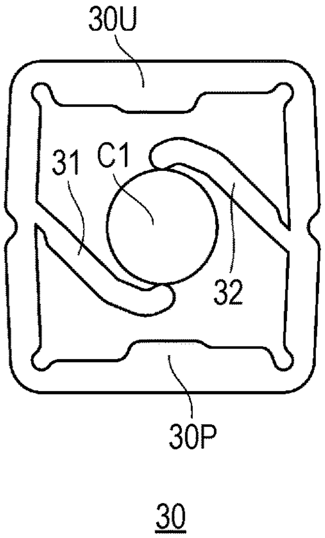
FIG. 3C is a cross-sectional view of a long tube or a tube according to another embodiment taken along a cross section perpendicular to an extending direction.
Figure 3D:
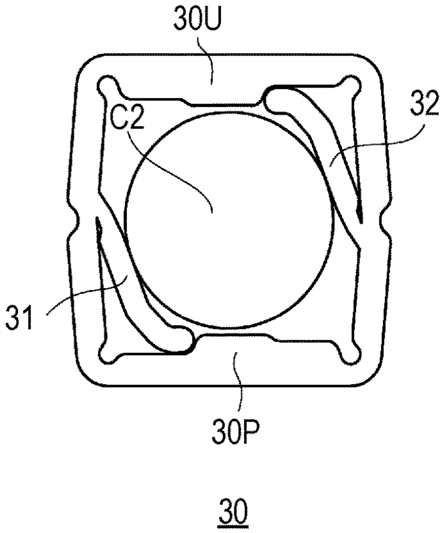
FIG. 3D is a cross-sectional view of a long tube or a tube according to another embodiment taken along a cross section perpendicular to an extending direction.

As shown in FIG. 3C and FIG. 3D, the first contact piece 31 and the second contact piece 32 are provided rotationally symmetrically with respect to a central axis of the long tube 30, and thus the linear body C1 and the linear body C2 having different diameters can be held by the first contact piece 31 and the second contact piece 32.

[Regarding Distance Relationship Between Joint Portions]

Furthermore, the long tube 30 according to the present embodiment additionally includes the following configuration.

That is, in the cross section of the long tube 30, the long tube 30 is configured such that a value (D1+D2+D3) that is a sum of a distance D1 between the first upper joint portion 31UC and the second upper joint portion 32UC, a distance D2 between the first joint portion 31C and the first upper joint portion 31UC, and a distance D3 between the second joint portion 32C and the second upper joint portion 32UC is the same as a value (D4+D5+D6) that is a sum of a distance D4 between the first lower joint portion 31LC and the second lower joint portion 32LC, a distance D5 between the first joint portion 31C and the first lower joint portion 31LC, and a distance D6 between the second joint portion 32C and the second lower joint portion 32LC.

Here, as shown in FIG. 3B, the distances D1 to D6 are measured based on horizontal distances between joint portions in the second state in which the long tube 30 is crushed by the external force and the upper portion 30U and the lower portion 30L approach each other (a distance between the first upper joint portion 31UC and the first lower joint portion 31LC is zeroed, and a distance between the second upper joint portion 32UC and the first lower joint portion 32LC is zeroed, and thus, in FIG. 3B, influences of these portions are considered to be slight, and the distances between these portions are omitted).

The inventors of the present application have focused on a point that the upper surface 30US can be prevented from being curved in a printing state by providing such a configuration. That is, in the long tube 30 of the type which is bent so as to spread outward as the first side wall 31W and the second side wall 32W, the value (D1+D2+D3) that is the sum of the distance D1, the distance D2, and the distance D3 corresponds to a width of an upper half of the long tube 30 in the second state. On the other hand, the value (D4+D5+D6) that is the sum of the distance D4, the distance D5, and the distance D6 corresponds to a width of a lower half of the long tube 30 in the second state. Therefore, when the both values are greatly different from each other, the upper surface 30US is curved in the second state. For example, in a case where the value (D4+D5+D6) is larger than the value (D1+D2+D3), the upper surface 30US is recessed downward.

Therefore, even when the distance D2 and the distance D5 are different from each other, even when the distance D1 and the distance D4 are different from each other, or even when the distance D5 and the distance D6 are different from each other, the upper surface 30US can be prevented from being curved in the printing state when the above-described relationship is satisfied.

Here, in the long tube 30 and the like shown in the present embodiment, the first upper joint portion 31UC is provided directly above the first lower joint portion 31LC, and similarly, the second upper joint portion 32UC is provided directly above the second lower joint portion 32LC, but even if the first upper joint 31UC and the second upper joint 32UC are provided at different positions in the horizontal direction instead of being provided directly above the first lower joint portion 31LC and the second lower joint portion 32LC, respectively, if the above-described relationship, that is, (D1+D2+D3)=(D4+D5+D6) is satisfied in the long tube of the type which bends outward, it is possible to prevent a situation in which the upper surface is shifted to a right or left from a determined position with respect to the lower surface in the printing state, and to uniquely determine a cross-sectional shape of the long tube 30 in the printing state.

As described above, according to the present embodiment, it is possible to provide a long tube that is slightly shifted to left and right when the long tube is crushed.

Constituent elements described in one embodiment may be added to or replaced with other embodiments within the exercise of a normal creative ability of those skilled in the art. For example, in a long tube of a type which is bent so as to spread outward as the first side wall 31W and the second side wall 32W, joint portions may function as starting points for bending so as to spread outward by setting curvatures of the joint portions different as in the second embodiment. For example, when the first joint portion 31C (second joint portion 32C) has a curvature radius equal to or greater than a first curvature radius along an outer wall surface and has a curvature radius less than the first curvature radius along an inner wall surface in the cross section, it is possible to promote bending in a direction in which the inner wall surface of the first side wall upper portion 31WU (second side wall upper portion 32WU) and the inner wall surface of the first side wall lower portion 31WL (second side wall lower portion 32WL) approach each other.

Fourth Embodiment

Figure 4B:
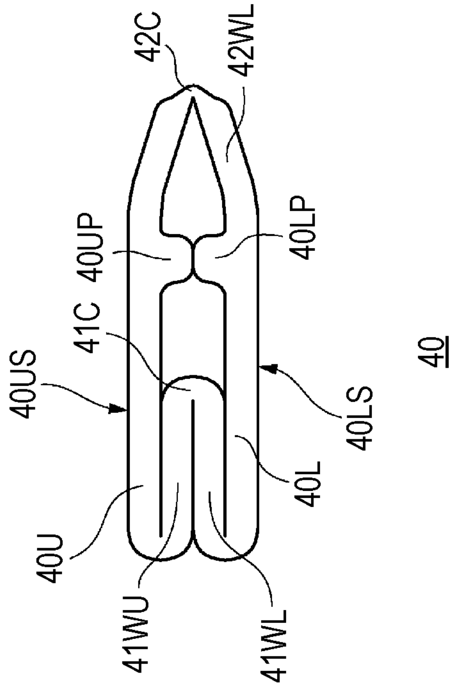
FIG. 4B is a cross-sectional view of a long tube according to another embodiment taken along a cross section perpendicular to an extending direction.
Figure 4A:
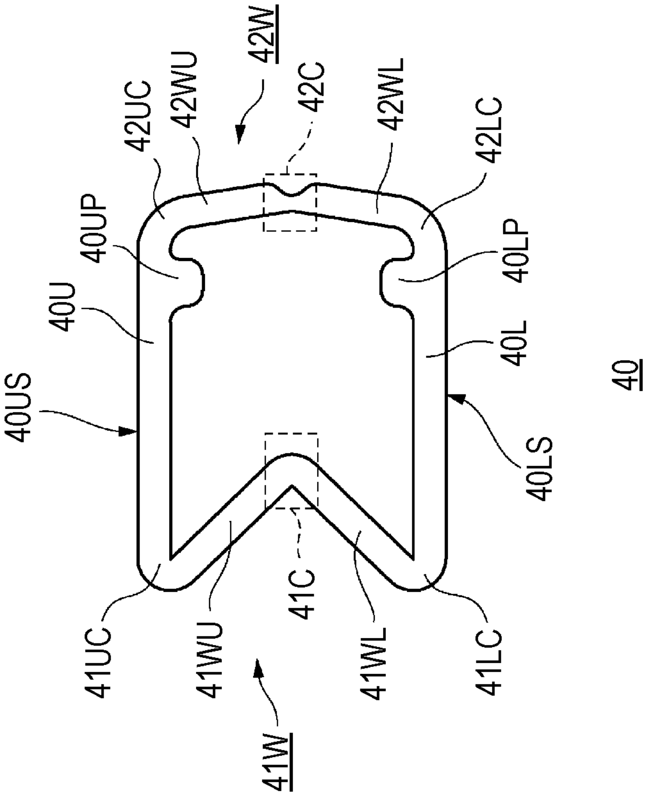
FIG. 4A is a cross-sectional view of a long tube according to another embodiment taken along a cross section perpendicular to an extending direction.

FIG. 4A shows a cross section of a long tube 40 according to the present embodiment in a first state, and FIG. 4B shows a cross section of the long tube 40 in a second state.

Similarly to the long tube 10, the long tube 40 includes an upper portion 40U including a printable upper surface 40US, a lower portion 40L including a lower surface 40LS, a first upper connection portion (first upper joint portion) 41UC connected to the upper portion 40U, a first lower connection portion (first lower joint portion) 41LC connected to the lower portion 40L, a first side wall 41W connected to the upper portion 40U via the first upper connection portion 41UC, connected to the lower portion 40L via the first lower connection portion 41LC, and including a first joint portion 41C that is bent and deformed when the upper portion 40U and the lower portion 40L approach each other, a second upper connection portion (second upper joint portion) 42UC connected to the upper portion 40U, a second lower connection portion (second lower joint portion) 42LC connected to the lower portion 40L, and a second side wall 42W connected to the upper portion 40U via the second upper connection portion 42UC, connected to the lower portion 40L via the second lower connection portion 42LC, and including a second joint portion 42C that is bent and deformed when the upper portion 40U and the lower portion 40L approach each other.

Since the first upper connection portion (first upper joint portion) 41UC, the first side wall 41W, and the first lower connection portion (first lower joint portion) 41LC have the same configurations as the first upper connection portion 21UC, the first side wall 21W, and the first lower connection portion 21LC of the long tube 20, a detailed description thereof will be omitted.

Since the second joint portion 42C has the same configuration as the second joint portion 32C, a detailed description thereof will be omitted.

According to the long tube 40 having the above-described configuration, when a downward external force is applied to the upper surface 40US by the pressing member such as a thermal head, since the upper portion 40U and the lower portion 40L approach each other, the first side wall 41W is bent inward similarly to the first side wall 21W, and thus the first joint portion 41C is bent while being displaced in a direction (inward) approaching the second side wall 42W. On the other hand, similarly to the second side wall 32W, the second side wall 42W is bent while being displaced in a direction (outward) away from the first side wall 41W.

Here, the long tube 40 is configured such that the upper portion 40U includes a convex portion 40UP protruding downward on a lower surface, and the lower portion 40L includes a convex portion 40LP protruding upward on an upper surface, and the convex portion 40UP and the convex portion 40LP are in contact with each other in the second state. Therefore, even in the second state, the upper surface 40US can be stably maintained flat.

Since the first side wall 41W is bent inward and the second side wall 42W is bent outward, the long tube 40 is preferably configured such that a value (D1−D2+D3) is the same as a value (D4−D5+D6). Here, a distance D1 corresponds to a distance between the first upper joint portion 41UC and the second upper joint portion 42UC, a distance D2 corresponds to a distance between the first joint portion 41C and the first upper joint portion 41UC, a distance D3 corresponds to a distance between the second joint portion 42C and the second upper joint portion 42UC, a distance D4 corresponds to a distance between the first lower joint portion 41LC and the second lower joint portion 42LC, a distance D5 corresponds to a distance between the first joint portion 41C and the first lower joint portion 41LC, and a distance D6 corresponds to a distance between the second joint portion 42C and the second lower joint portion 42LC.

As described above, two side walls of a long tube may both be bent inward, may both be bent outward, or one may be bent inward and the other may be bent outward. In any configuration, since side walls can be bent at predetermined positions by providing joint portions at determined positions, it is possible to uniquely determine a cross-sectional shape in the second state.

Fifth Embodiment

Figure 5B:
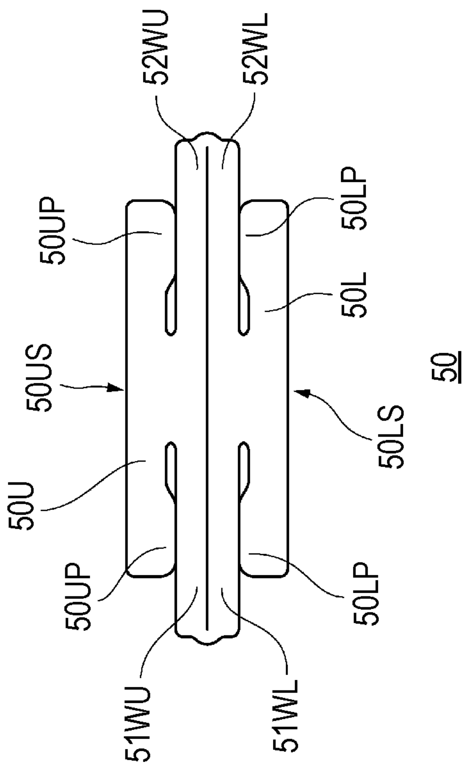
FIG. 5B is a cross-sectional view of a long tube according to another embodiment taken along a cross section perpendicular to an extending direction.
Figure 5A:
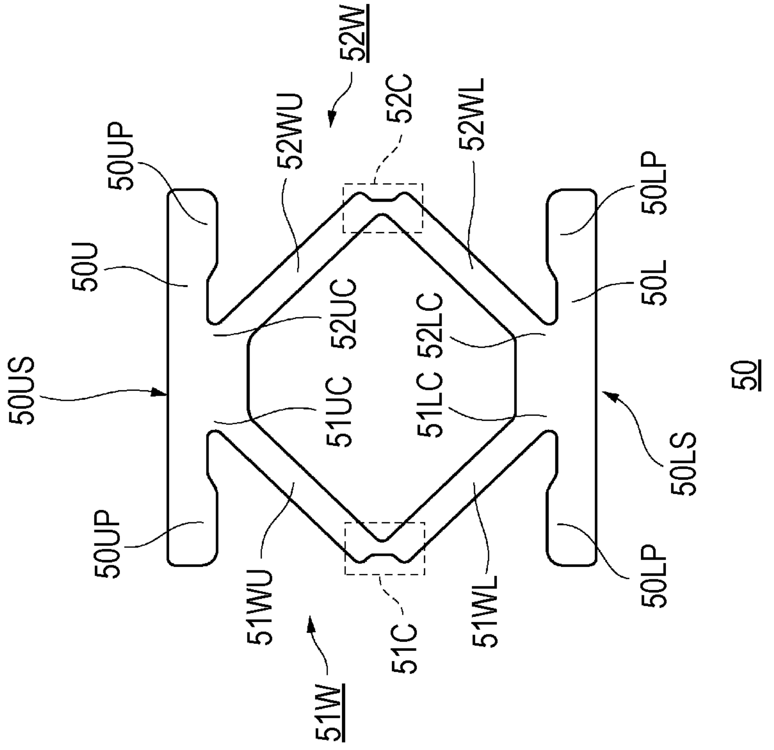
FIG. 5A is a cross-sectional view of a long tube according to another embodiment taken along a cross section perpendicular to an extending direction.

FIG. 5A shows a cross section of a long tube 50 according to the present embodiment in a first state, and FIG. 5B shows a cross section of the long tube 50 in a second state.

Similarly to the long tube 10, the long tube 50 includes an upper portion 50U including a printable upper surface 50US, a lower portion 50L including a lower surface 50LS, a first upper connection portion (first upper joint portion) 51UC connected to the upper portion 50U, a first lower connection portion (first lower joint portion) 51LC connected to the lower portion 50L, a first side wall 51W connected to the upper portion 50U via the first upper connection portion 51UC, connected to the lower portion 50L via the first lower connection portion 51LC, and including a first joint portion 51C that is bent and deformed when the upper portion 50U and the lower portion 50L approach each other, a second upper connection portion (second upper joint portion) 52UC connected to the upper portion 50U, a second lower connection portion (second lower joint portion) 52LC connected to the lower portion 50L, and a second side wall 52W connected to the upper portion 50U via the second upper connection portion 52UC, connected to the lower portion 50L via the second lower connection portion 52LC, and including a second joint portion 52C that is bent and deformed when the upper portion 50U and the lower portion 50L approach each other.

The present embodiment differs from the other embodiments in that the upper portion 50U includes a portion extending outward (left direction of a paper plane) from the first upper connection portion 51UC and a portion extending outward (right direction of the paper plane) from the second upper connection portion 52UC in an opposite direction, and on the other hand, the lower portion 50L includes a portion extending outward (left direction of the paper plane) from the first lower connection portion 51LC and a portion extending outward (right direction of the paper plane) from the second upper connection portion 52UC in the opposite direction. According to such a configuration, it is possible to ensure a wide width of the printable upper surface 50US.

A first side wall upper portion 51WU (second side wall upper portion 52WU) extends downward from the first upper connection portion 51UC (second upper connection portion 52UC) in a direction away from the second side wall 52W (first side wall 51W) and is connected to the first joint portion 51C (second joint portion 52C), and a first side wall lower portion 51WL (second side wall lower portion 52WL) extends upward from the first lower connection portion 51LC (second upper connection portion 52LC) in a direction away from the second side wall 52W (first side wall 51W) and is connected to the first joint portion 51C (second joint portion 52C).

As shown in FIG. 5A, the first upper connection portion 51UC and the second upper connection portion 52UC approach each other, and similarly, the first lower connection portion 51LC and the second lower connection portion 52LC approach each other, but since the upper surface 50US includes extended portions, it is possible to ensure a printable flat surface.

As shown in FIG. 5B, in the second state, since the first joint portion 51C and the second joint portion 52C are bent outward, inner wall surfaces of the first side wall upper portion 51WU and the second side wall upper portion 52WU are in contact with inner wall surfaces of the first side wall lower portion 51WL and the second side wall lower portion 52WL, respectively. As a result, the first side wall lower portion 51WL and the second side wall lower portion 52WL are stacked on the lower portion 50L, the first side wall upper portion S1WU and the second side wall upper portion 52WU are stacked on the first side wall lower portion S1WL and the second side wall lower portion 52WL, and the upper portion 50U is stacked on the first side wall upper portion 51WU and the second side wall upper portion 52WU. Therefore, even in the second state, the upper surface 50US can be stably maintained flat. In addition, the upper portion 50U includes two convex portions 50UP protruding downward from an lower surface, and the convex portions 50UP are configured to come into contact with an outer peripheral surface of the first side wall upper portion 51WU or the second side wall upper portion 52WU in the second state. Further, since the lower portion 50L includes two convex portions 50LP protruding upward from an upper surface, and the convex portions 50LP are configured to come into contact with an outer peripheral surface of the first side wall lower portion 51WL or the second side wall lower portion 52WL in the second state, and thus the upper surface SOUS can be more stably maintained flat.

Sixth Embodiment

Figure 6A:
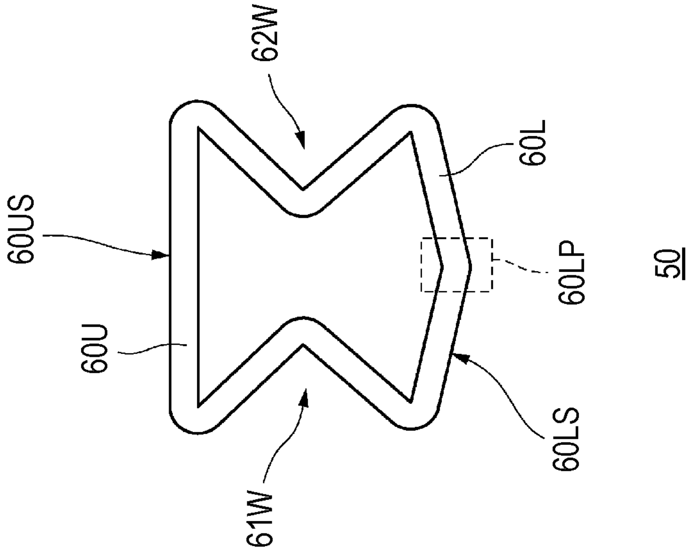
FIG. 6A is a cross-sectional view of a long tube according to another embodiment taken along a cross section perpendicular to an extending direction.
Figure 6B:
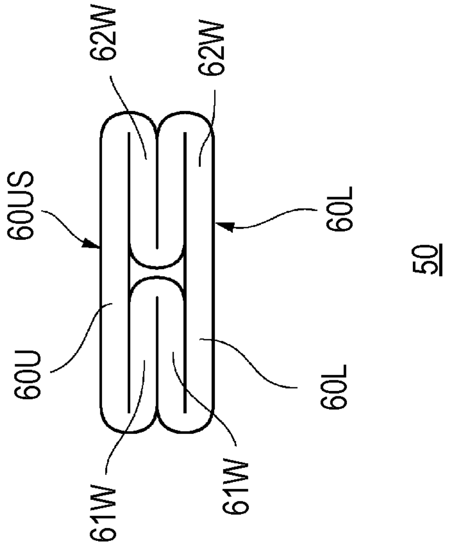
FIG. 6B is a cross-sectional view of a long tube according to another embodiment taken along a cross section perpendicular to an extending direction.

FIG. 6A shows a cross section of a long tube 60 according to the present embodiment in a first state, and FIG. 6B shows a cross section of the long tube 60 in a second state.

Unlike the long tube 10, a lower portion 60L of the long tube 60 is provided with a deformable lower joint portion 60LC that is bent. Therefore, unlike the lower portion 10L, the lower portion 60L is configured to be deformable. That is, the long tube 60 includes an upper surface 60US and a lower surface 60LS (facing surface) facing in a direction opposite to the upper surface 60US, and includes the lower joint portion 60LC that is deformed when an upper portion 60U and the lower portion 60L approach each other.

Unlike the case where a lower portion is provided which is curved and therefore difficult to flatten, as shown in the same figure, in the second state, the lower portion 60L is flattened from a state in which the lower joint portion 60LC is bent. Therefore, the lower portion 60L can support the upper portion 60U such that the upper surface 60US is flat.

The upper portion 60U, a first side wall 61W, and a second side wall 62W other than the lower portion 60L have the same configurations as the upper portion 20U, the first side wall 21W, and the second side wall 22W, respectively, and thus descriptions thereof will be omitted.

As described above, the lower portion may include a portion that is bent in the first state and is deformed to be flat in the second state. According to the present embodiment, it is also possible to provide a long tube that shifts slightly to left and right when the long tube is crushed. A configuration of the lower portion shown in the present embodiment may be adopted as a lower portion of another embodiment.

Seventh Embodiment

Figure 7B:
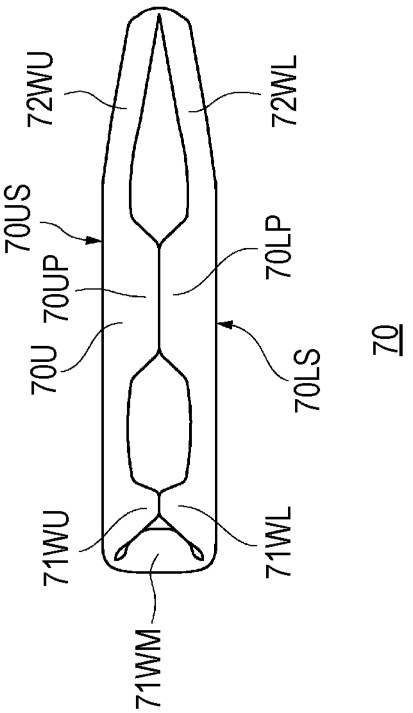
FIG. 7B is a cross-sectional view of a long tube according to another embodiment taken along a cross section perpendicular to an extending direction.
Figure 7A:
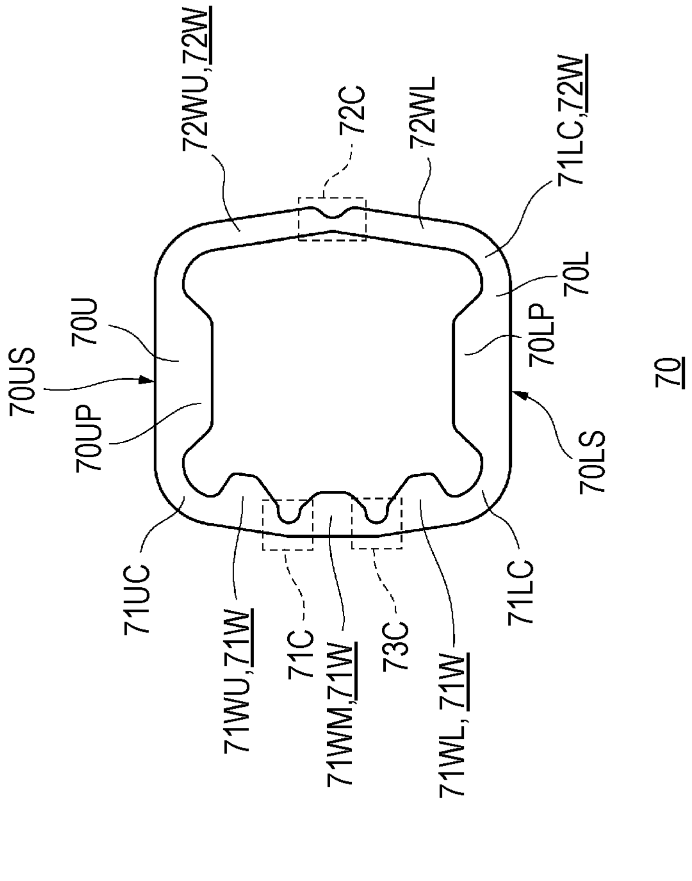
FIG. 7A is a cross-sectional view of a long tube according to another embodiment taken along a cross section perpendicular to an extending direction.

FIG. 7A shows a cross section of a long tube 70 according to the present embodiment in a first state, and FIG. 7B shows a cross section of the long tube 70 in a second state.

The long tube 70 is bent such that both a first side wall 71W and a second side wall 72W spread outward. The long tube 70 differs from the long tube 10 and the like in that the numbers of joint portions of two side walls are different. Specifically, the first side wall 71W of the long tube 70 includes two joint portions, that is, a first joint portion 71C and a third joint portion 73C, while the second side wall 72W includes one joint portion, that is, a second joint portion 72C. Thus, the first side wall 71W includes a first side wall upper portion 71WU provided between the first joint portion 71C and a first upper connection portion 71UC, a first side wall middle portion 71WM provided between the first joint portion 71C and the third joint portion 73C, and a first side wall lower portion 71WL provided between the third joint portion 73C and a first lower connection portion 71LC. On the other hand, the second side wall 72W includes a second side wall upper portion 72WU provided between the second joint portion 72C and a second upper connection portion 72UC, and a second side wall lower portion 72WL provided between the second joint portion 72C and a second lower connection portion 72LC.

Further, the long tube 70 also differs from the long tube 10 and the like in that a side wall is bent such that a part of an outer wall surface of the side wall forms a surface continuous with an upper surface in the second state. Specifically, as shown in the same figure, the first side wall upper portion 71WU of the long tube 70 forms a surface continuous with an upper surface 70US by bending the first joint portion 71C, and the first side wall lower portion 71WL forms a surface continuous with a lower surface 70LS by bending the third joint portion 73C. At this time, since an inner wall surface of the first side wall upper portion 71WU and an inner wall surface of the first side wall lower portion 71WL are in contact with each other, the upper surface 70US can be supported to be flat. In addition, in the second state, the first side wall middle portion 71WM is configured to be in contact with a protruding slope of the first side wall upper portion 71WU and a protruding slope of the second side wall lower portion 71WL, and thus positions of the first joint portion 71C and the third joint portion 73C are determined. Therefore, a cross-sectional shape of the long tube 70 in the printing state can be uniquely determined.

On the other hand, the second side wall 72W is bent while the second joint portion 72C is displaced outward. At this time, since an upper portion 70U includes a convex portion 70UP protruding downward on a lower surface, a lower portion 70L includes a convex portion 70LP protruding upward on an upper surface, and the convex portion 70UP and the convex portion 70LP are configured to be in contact with each other in the second state, and thus the upper surface 70US can be supported so as to be flat.

As described above, according to the present embodiment, it is possible to provide a long tube that is slightly shifted to left and right when the long tube is crushed.

In the second state, the side wall is bent at a joint portion such that the part of the outer wall surface of the side wall is continuous with the upper surface. Therefore, a printable region can be expanded, and printing can be performed on the upper surface and the side surface. For example, characters may be printed on the upper surface 70US, and a color may be printed on an outer peripheral surface of the first side wall upper portion 71WU.

Further, since the side wall is bent at the joint portion such that the part of the outer wall surface of the side wall is continuous with the upper surface, it is possible to reduce a thickness of the long tube in the second state. Therefore, it is possible to stably support the upper surface. A convex portion may not be provided on one of an upper portion and a lower portion. For example, the convex portion 70UP may be configured to be in contact with the upper surface of the lower portion 70L without providing the convex portion 70LP, or the convex portion 70LP may be configured to be in contact with the lower surface of the upper portion 70U. In the former case, it is preferable to increase a protrusion amount of the convex portion 70UP so that the upper surface 70US maintains a flat surface.

As described in the above embodiments, the present application discloses a closed type long tube formed of an elastic material. Since joint portions are provided at predetermined positions, the long tube is bent at the predetermined positions when an upper portion and a lower portion approach each other and the long tube is crushed. As a result of stabilizing the bending positions, a shape of the long tube when the long tube is crushed is stabilized, and therefore, it is possible to provide the long tube that is slightly shifted to a left and right when the long tube is crushed.

Further, since the long tube is of the closed type in which an inner wall surface is a closed line in a cross section, a tube does not come off after a linear body is inserted into the tube formed by separating the long tube.

In addition, since the long tube is formed of the elastic material, the long tube can be engaged with linear bodies having a plurality of diameters.

Since side walls are bent when the long tube is crushed, deformation of an upper surface is prevented. Therefore, by using the upper surface as a printing surface, it is possible to suitably perform printing.

Further, the long tube may be deformed in consideration of the following points.

[Regarding Upper Surface]

The inventors of the present application have studied a change in an appearance of characters or the like printed on the upper surface when a shape of the upper surface is deformed. For example, when an outer wall surface of the long tube in the cross section is a circle, it is difficult to identify the printed characters or the like from a direction inclined by 45 degrees. For example, since it is difficult to distinguish between "E" and "F" if presence or absence of a horizontal line at a lower end cannot be visually recognized, when a width (for example, the width W1 in FIG. 1A) of the long tube in the cross section is 5 mm, and the upper surface in the cross section is an arc (arc having a central angle of 180 degrees) having a radius of 2.5 mm, and "E" and "F" having a height of 3 mm are printed, the lower end is difficult to see. Thus, it is confirmed that "E" and "F" are difficult to distinguish from the 45 degree inclined direction.

On the other hand, if the width (for example, the width W1 in FIG. 1A) of the long tube is 5 mm, the upper surface in the cross section is an arc (arc having a central angle of 90 degrees) having a radius of 3.53 ($2.5\times2^{0.5}$) mm, and "E" and "F" having a height of 3 mm are printed, it is confirmed that "E" and "F" can be distinguished from the direction inclined by 45 degrees.

Accordingly, the upper surface may be a flat surface or a curved surface. However, a straight line or a curved line representing the upper surface in the cross section in the first state is preferably an arc having a central angle of 90 degrees inscribed in left and right ends of the upper surface in the cross section, or a straight line or curved line that is presented below this arc.

[Regarding Curvature Radius of Joint Portion]

As described above, the joint portion can be achieved by various configurations, and as one of the configurations, a configuration in which a curvature radius of a portion to be bent is reduced has been disclosed. For example, when the joint portion is desired to be bent inward, the joint portion can be used as a starting point of deformation by setting a curvature of an outer wall surface of the joint portion smaller than a curvature of a surrounding portion (a curvature of an inner wall surface of the joint portion may be curved). In the case of the configuration shown in FIG. 2A, a curvature of the outer wall surface of the first joint portion 21C is small, and curvatures of the outer wall surfaces of the first side wall upper portion 21WU and the first side wall lower portion 21WL adjacent to the first joint portion 21C are large (infinite in the case of the straight line). Therefore, in a graph in which a horizontal axis represents a position along an outer wall surface and a vertical axis represents a curvature, the curvature of the first joint portion 21C takes a minimum value. Similarly, in a graph in which a horizontal axis represents a position along an inner wall surface and a vertical axis represents a curvature, a curvature of the first upper connection portion 21UC takes a minimum value.

The inventors of the present application have studied optimization of the curvature of the joint portion, and have focused on the fact that when the curvature of the joint portion is too large, a shift of the upper surface with respect to the lower surface becomes large in the printing state. For example, when it is assumed that the width (for example, the width W1 in FIG. 1A) of the long tube in the cross section is 5 mm and characters or the like having a height of 2.5 mm are printed within a range of 4 mm, it is necessary to set a shift amount in the second state to 0.75 mm (=(4−2.5)/2) or less. If the shift amount in the second state is greater than 0.75 mm, the characters or the like protrude from a printing region within the range of 4 mm, and in some cases, a situation may occur in which a lower end or an upper end of characters or the like is not printed on the upper surface. Therefore, in the specific examples described above, it is preferable to set the shift amount of the upper surface with respect to the lower surface to 0.75 mm or less when the state is changed from the first state to the second state.

However, even if the curvature radius of the portion to be bent is reduced, the shift amount does not become zero. For example, in FIG. 2A, when an angle between a lower surface of the upper portion 20U and the inner wall surface of the first side wall upper portion 21WU is about 40 degrees, if the curvature radius of an inner wall surface of the first upper connection portion 21UC is 0.25 mm, an arc having a radius of 0.25 mm inscribed in a lower surface of the upper portion 20U and the inner wall surface of the first side wall upper portion 21WU has a length of about 0.6 mm. Therefore, even if the first upper connection portion 21UC is bent, a shift of about 0.3 mm or less, which is half of the arc length, may occur. Similarly, when an angle between an upper surface of the lower portion 20L and the inner wall surface of the first side wall lower portion 21WL is about 40 degrees, if the curvature radius of the inner wall surface of the first lower connection portion 21LC is 0.25 mm, a shift of about 0.3 mm or less may occur. When an angle formed by the outer wall surface of the first side wall upper portion 21WU and the outer wall surface of the first side wall lower portion 21WL sandwiching the first joint portion 21C is about 80 degrees, if the curvature radius of the outer wall surface of the first joint portion 21C is 0.25 mm, an arc having a radius of 0.25 mm inscribed in the outer wall surface of the first side wall upper portion 21WU and the outer wall surface of the first side wall lower portion 21WL has a length of about 0.425 mm. However, in the figure, since the first side wall upper portion 21WU adjacent to the first joint portion 21C extends obliquely to the right and the first side wall lower portion 21WL extends obliquely to the opposite left, a shift of about 0.21 mm or less, which is half the length, may occur.

As a result, a maximum value of a sum of shift amounts of the first upper connection portion 21UC, the first lower connection portion 21LC, and the first joint portion 21C is about 0.81 mm. Since this value exceeds 0.75 mm, a situation may occur in which the lower end or the upper end of the characters or the like is not printed on the upper surface.

In consideration of the above, it is preferable that the curvature radius of the portion to be bent is small. For example, the curvature radius of the portion to be bent in the cross section is preferably smaller than the wall thickness of the portion. For example, when the wall thickness is 0.3 mm, the curvature along the outer wall surface of the first joint portion 21C bent inward is preferably less than 0.3 mm, and a curvature along the inner wall surface may be 0.3 mm or more.

In consideration of a standard case in which a region of 80% of the width of the long tube is set as a printing region and the characters or the like having the height of 50% of the width are printed, a shift amount is preferably 15% or less of a width W of the long tube in the cross section. Therefore, in a first side wall (for example, the first side wall 21W) bent inward, when a curvature radius along an inner wall surface of a first upper connection portion (for example, the first upper connection portion 21UC) in the cross section is defined as a curvature radius R1, a curvature radius along an inner wall surface of a first lower connection portion (for example, the first lower connection portion 21LC) is defined as a curvature radius R2, a length of an arc having the radius R1 inscribed in an inner wall surface of the upper portion (for example, the upper portion 20U) and an inner wall surface of a first side wall upper portion is defined as a first shift amount DS1, and a length of an arc of the radius R2 inscribed in an inner wall surface of the lower portion (for example, the lower portion 20L) and an inner wall surface of the first side wall lower portion is defined as a second shift amount L2, it is preferable to determine the radius R1 and the radius R2 such that at least a value (DS1+DS2) which is a sum of the first shift amount and the second shift amount is 0.15×W or less, that is, such that a relationship of (DS1+DS2)≤0.15 W is satisfied.

[Regarding Positional Relationship Between Connection Portion and Lower Surface]

In the cross section of the long tube of the type that bends inward, it is preferable that the inner wall surfaces of the first lower connection portion and the second lower connection portion are located inside a support point supported by a support body such as a platen roller on the lower surface of the lower portion. With such a configuration, it is possible to promote inward bending of the first lower connection portion.

Figure 8:
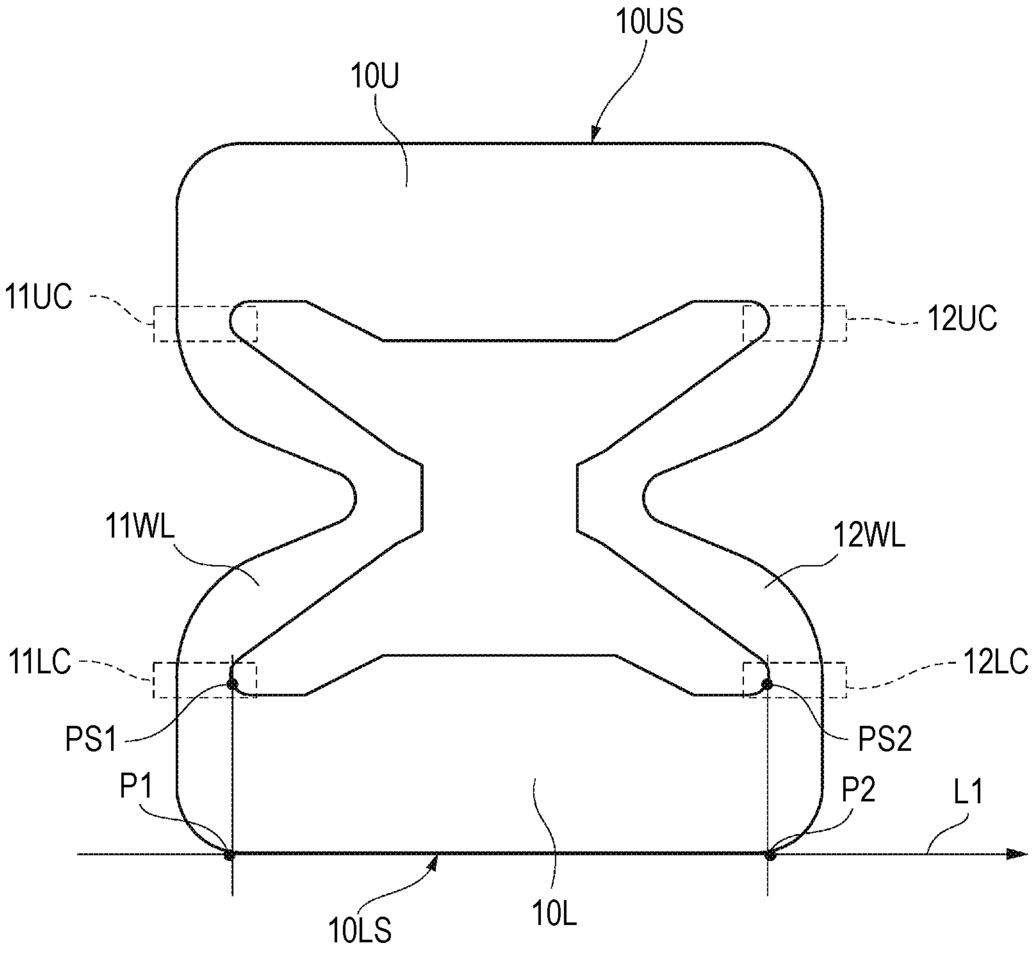
FIG. 8 is a cross-sectional view of a long tube according to another embodiment taken along a cross section perpendicular to an extending direction.

FIG. 8 is a cross-sectional view of the long tube 10 taken along the cross section perpendicular to the extending direction, as an example. In FIG. 8, a line L1 is a virtual tangent line that is in contact with the lower surface 10LS of the lower portion 10L. The line L1 intersects with the lower surface 10LS at least at a first point P1 on the first side wall 11W side and a second point P2 on the second side wall 12W side. This virtual tangent line corresponds to a surface of the support body.

On the other hand, a position PS1 of the first lower connection portion 11LC closest to the second point P2 when the line L1 is taken as an axis is located between the first point P1 and the second point P2 when the line L1 is taken as the axis, and thus inward displacement of the first side wall lower portion 11WL is promoted by an external force acting from the support body at the first point P1. Similarly, a position PS2 of the second lower connection portion 12LC closest to the first point P1 when the line L1 is taken as the axis is located between the first point P1 and the second point P2 when the line L1 is taken as the axis, and thus inward displacement of the second side wall lower portion 12WL is promoted by an external force acting from a support body at the second point P2.

Such a configuration can be applied to the long tube of the type that bends inward.

It is preferable to apply an opposite positional relationship in the long tube of the type that bends outward. That is, it is preferable that a position PS1 of the first lower connection portion 11LC closest to the second point P2 when the line L1 is taken as the axis is located outside the first point P1 when the line L1 is taken as the axis, and the position PS2 of the second lower connection portion 12LC closest to the first point P1 when the line L1 is taken as the axis is positioned outside the second point P2 when the line L1 is taken as the axis.

In addition, various modifications can be made to the present disclosure without departing from the gist thereof. For example, a part of the constituent elements in one embodiment may be added to other embodiments within the range of a normal creative ability of those skilled in the art. Further, a part of the constituent elements in one embodiment can be replaced by corresponding constituent elements in other embodiments.

The invention claimed is:

1. A long tube formed of an elastic material and including inner wall surfaces capable of supporting an inserted linear body, comprising:

an upper portion including a printable upper surface;

a lower portion facing the upper portion and including a lower surface;

a first side wall connecting the upper portion and the lower portion;

a second side wall connecting the upper portion and the lower portion and facing the first side wall;

a first upper joint portion located at a connection portion between the upper portion and the first side wall and configured to bend the first side wall inward with respect to the upper portion;

a first lower joint portion located at a connection portion between the lower portion and the first side wall and configured to bend the first side wall inward with respect to the lower portion;

a second upper joint portion located at a connection portion between the upper portion and the second side wall and configured to bend the second side wall inward with respect to the upper portion; and a second lower joint portion located at a connection portion between the lower portion and the second side wall and configured to bend the second side wall inward with respect to the lower portion, wherein the first side wall includes:

a first joint portion;

a third joint portion;

a first side wall upper portion provided between the first upper joint portion and the first joint portion;

a first side wall lower portion provided between the first lower joint portion and the third joint portion; and a first side wall middle portion provided between the first joint portion and the third joint portion, and including an inner wall surface extending vertically with respect to the upper surface and the lower surface, wherein the second side wall includes:

a second joint portion;

a fourth joint portion;

a second side wall upper portion provided between the second upper joint portion and the second joint portion;

a second side wall lower portion provided between the second lower joint portion and the fourth joint portion; and a second side wall middle portion provided between the second joint portion and the fourth joint portion, and including an inner wall surface extending vertically with respect to the upper surface and the lower surface, wherein the first joint portion is formed to be thinner than a thickness of the first side wall upper portion and a thickness of the first side wall middle portion, wherein the third joint portion is formed to be thinner than a thickness of the first side wall lower portion and a thickness of the first side wall middle portion, wherein the second joint portion is formed to be thinner than a thickness of the second side wall upper portion and a thickness of the second side wall middle portion, wherein the fourth joint portion is formed to be thinner than a thickness of the second side wall lower portion and a thickness of the second side wall middle portion, wherein the upper portion includes a convex portion protruding downward on a center of a lower surface thereof, wherein the lower portion includes a convex portion protruding upward on a center of an upper surface thereof, and wherein, in a cross-sectional view, portions including the first side wall upper portion, the first upper joint portion, the upper portion, the second upper joint portion, and the second side wall upper portion are configured to be vertically symmetrical to portions including the first side wall lower portion, the first lower joint portion, the lower portion, the second lower joint portion, and the second side wall lower portion, respectively.

2. The tube according to claim 1, wherein in the cross-sectional view, the portions including the first side wall upper portion, the first upper joint portion, the upper portion, the second upper joint portion, and the second side wall upper portion are configured to be laterally symmetrical to the portions including the first side wall lower portion, the first lower joint portion, the lower portion, the second lower joint portion, and the second side wall lower portion, respectively.

3. The tube according to claim 1, wherein in the cross-sectional view, a value obtained by subtracting, from a distance between the first upper joint portion and the second upper joint portion, a sum of a distance between the first joint portion and the first upper joint portion and a distance between the second joint portion and the second upper joint portion is the same as a value obtained by subtracting, from a distance between the first lower joint portion and the second lower joint portion, a sum of a distance between the third joint portion and the first lower joint portion and a distance between the fourth joint portion and the second lower joint portion.

4. The tube according to claim 1, wherein the upper portion has a thickness equal to or greater than thicknesses of the first side wall and the second side wall in the cross-sectional view.

5. The tube according to claim 2, wherein in the cross-sectional view, a distance between the first upper joint portion and the second upper joint portion is equal to a distance between the first lower joint portion and the second lower joint portion, a distance between the first joint portion and the first upper joint portion, a distance between second joint portion and the second upper joint portion, a distance between the third joint portion and the first lower joint portion, and a distance between the fourth joint portion and the second lower joint portion are the same, and the distance between the first joint portion and the first upper joint portion is 50% or less of the distance between the first upper joint portion and the second upper joint portion.

* * * * *